United States Patent [19]
Wheeler et al.

[11] Patent Number: 6,009,081
[45] Date of Patent: Dec. 28, 1999

[54] PRIVATE NETWORK ACCESS POINT ROUTER FOR INTERCONNECTING AMONG INTERNET ROUTE PROVIDERS

[75] Inventors: Christopher D. Wheeler; Ophir Ronen, both of Seattle, Wash.

[73] Assignee: InterNap Network Services, Seattle, Wash.

[21] Appl. No.: 08/922,954

[22] Filed: Sep. 3, 1997

[51] Int. Cl.$^6$ .................................. H04L 12/46; H04L 12/56
[52] U.S. Cl. .......................... 370/255; 370/351; 370/401
[58] Field of Search .................................. 370/248, 252, 370/253, 254, 255, 351, 400, 401, 402, 403, 404, 405; 395/200.5, 200.51, 200.52, 200.53, 200.68, 200.69, 200.7, 200.71, 200.72; 709/220, 221, 222, 223, 238, 239, 240, 241, 242

[56] References Cited

U.S. PATENT DOCUMENTS

| | | | |
|---|---|---|---|
| 5,452,294 | 9/1995 | Natarajan | 370/351 |
| 5,477,536 | 12/1995 | Picard | 370/400 |
| 5,631,897 | 5/1997 | Pacheco et al. | 370/237 |
| 5,675,741 | 10/1997 | Aggarwal et al. | 395/200.12 |
| 5,754,547 | 5/1998 | Nakazawa | 370/401 |
| 5,805,594 | 9/1998 | Kotchey et al. | 370/401 |
| 5,835,710 | 11/1998 | Nagami et al. | 395/200.8 |
| 5,845,091 | 12/1998 | Dunne et al. | 395/200.7 |

Primary Examiner—Chi H. Pham
Assistant Examiner—Kwang B. Yao
Attorney, Agent, or Firm—LaRiviere, Grubman & Payne

[57] ABSTRACT

A method for interconnecting P-NAP customers with P-NAP providers and symmetrically routing packets between a P-NAP customer and a destination within a P-NAP provider's backbone across the P-NAP and that provider's backbone or symmetrically routing packets between a P-NAP customer and a destination not currently within a P-NAP provider's backbone across the P-NAP and a pre-defined P-NAP provider's backbone known as the default backbone. The method comprises creating a list of all P-NAP provider AS numbers and a list of all AS numbers which peer at public NAPs but which are not associated with P-NAP providers. For each P-NAP provider, take the union of all provider AS numbers and AS numbers associated with public NAPs and subtracting out AS numbers associated with the current provider. Deny that resulting list of AS numbers on routes as they are received from the current provider to approximate the routes which are deemed to be destined within the current provider's network by tagging these routes with the primary local preference value. For all routes which were denied, attach the secondary local preference value. Set P-NAP provider local preferences causing the P-NAP provider to select direct routing from the P-NAP provider to the P-NAP. Make changes to AS path lengths of routes advertised by the P-NAP to each P-NAP provider to cause providers not directly connected to the P-NAP to use the same preselected P-NAP provider as the P-NAP uses to send to the providers.

4 Claims, 24 Drawing Sheets

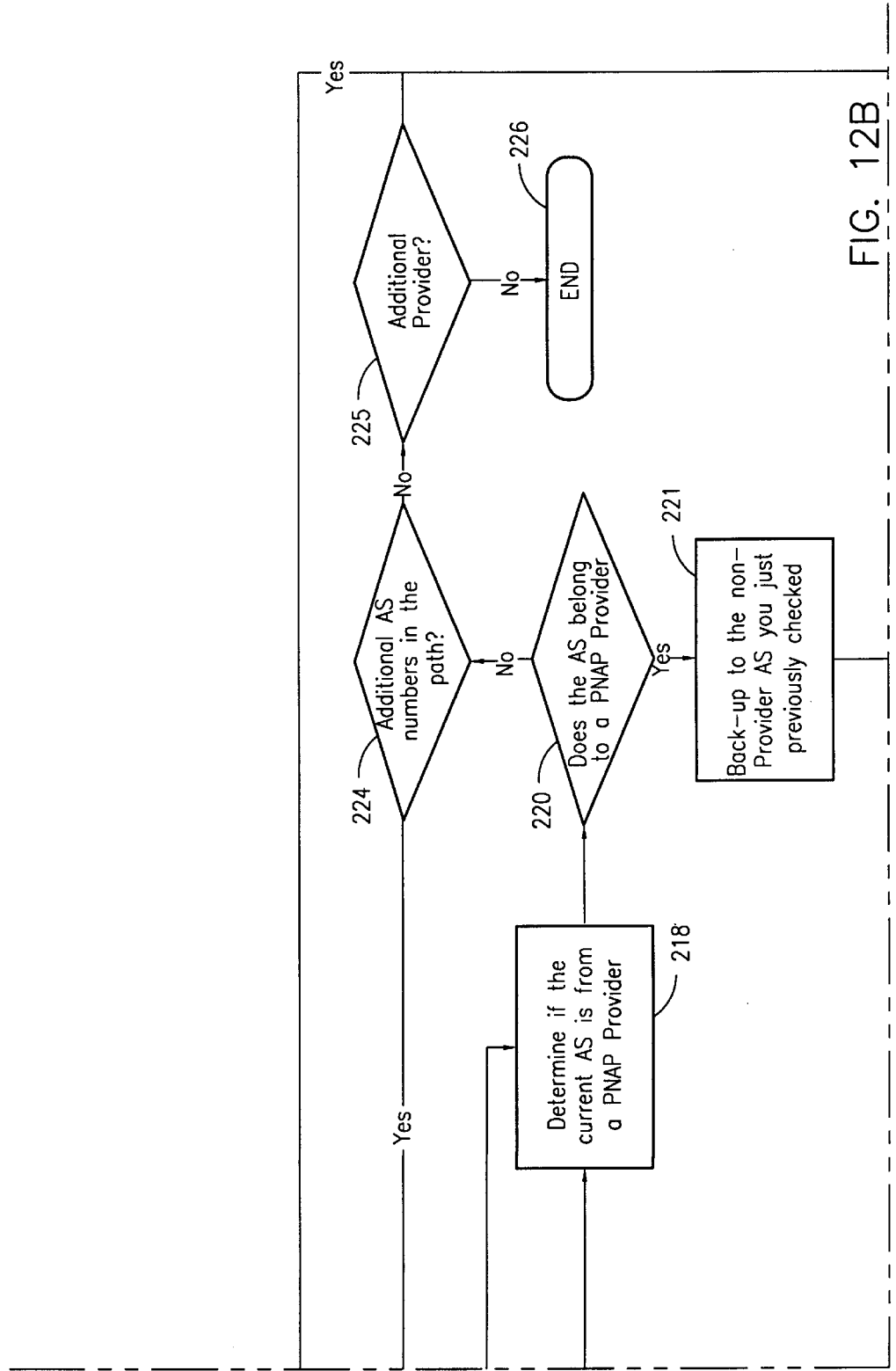

PRIVATE NETWORK ACCESS POINT ROUTER FOR INTERCONNECTING AMONG INTERNET ROUTE PROVIDERS

FIELD OF THE INVENTION

The present invention relates to route switching on a layer 3 TCP/IP network such as the Internet and, more particularly, to a method for routing information packets symmetrically on selected forward and return paths in a network involving a plurality of traffic carrying networks.

BACKGROUND OF THE INVENTION

Within the Internet today, packets of data are routed between sources and destinations over a plurality of large, nationwide networks whose operating entities are typically referred to as National Internet Service Providers or NSPs. An NSP is an Internet Service Provider (ISP) which has a nationwide network of DS3 capacity of 44.736 Megabits per second (Mbps) or higher, and is present at a minimum of five public NAPs. NAP stands for Network Access Point. There are at least 15–20 such nationwide networks in the United States (U.S.) at the present time, many of which are owned and operated by large telephone companies. Some representative NSPs are MCI, Sprint, WorldCom/UUNet, ANS, AGIS, Netcom and PSI.

In the pre-commercial days of the Internet, there was one NSP, the US National Science Foundation (NSF), which ran a nationwide network infrastructure known as the NSFNet. If two end-users wanted to communicate with one another, they had to connect either directly or indirectly (via a smaller regional ISP) to the NSFNet. Over time, a small number of commercial entities evolved to create their own nationwide network infrastructures which provided the same services as the NSFNet, but for the commercial sector. When the NSF decided to decommission the NSFNet and thereby commercialize the entire Internet, it was anticipated that there would evolve an even larger number of commercial nationwide network infrastructures which would become the Internet connectivity points, either directly or indirectly (via a smaller regional ISP), for all end-users. Two end-users connected via the same national infrastructure would communicate with one another over that infrastructure, but a method was needed to allow for the exchange of traffic between the various national infrastructures so end-users on different infrastructures could communicate with one another. This problem was solved by the creation of several Network Access Points or NAPs.

A public NAP is a public infrastructure operated by private entities (NAP operators) which creates a neutral meeting place for the exchange of TCP/IP packet traffic between any two entities connected to the NAP, provided the entities have an agreement in place to exchange traffic (known as a peering agreement). Today, there are five major NAPs located in the U.S. Two are located in the San Francisco Bay area, one in Washington, D.C., one in New York, and one in Chicago. The NAP operator is paid a fee by any entity connecting to the NAP, and the peering agreements between entities outline the strategy for cost-recovery of their traffic exchange (if any).

Although the NAP architecture seemed sound when it was first developed, time has shown that it has failed to scale with the growth of the Internet. There are a number of reasons for this. First, because the Internet routing protocol used among entities at a NAP (Border Gateway Protocol version 4, or BGP4) does not have hooks to allow for automated, even traffic distribution across NAPs, most of the world's exchanged traffic occurs at a small number of the total number of NAPs because the NAPs which are used must be manually configured by each provider. The result of this is that those NAPs which are taking most of the traffic are overloaded and packets going through them are being dropped. It should be noted that the Transmission Control Protocol/Internet Protocol (TCP/IP) can gracefully recover from a dropped packet because of its Acknowledgement scheme, but this greatly increases the time it takes for information to be exchanged between two end-users, thus causing performance problems for the users. Second, the lack of quick technical advances in Local Area Network/Metropolitan Area Network (LAN/MAN) technologies have made the NAP scaling problems worse. Asynchronous Transfer Mode (ATM) and its promise of high bandwidth is unsuitable for TCP/IP traffic. FDDI (Fiber Distributed Data Interface, operating at 100 Mbps) the only current, stable LAN technology today, is not enough bandwidth to handle traffic levels in the current model. Finally, because the NAP infrastructures are managed by the NAP operators and connections into the NAPs are managed by the connecting entities themselves, there is a continual discontinuity between the available bandwidth within the NAP infrastructure and the amount of bandwidth the entities put into the NAP, thus causing more packet loss.

Thus, there exists a need for a way to bypass the NAPs whenever possible by creating a new interconnection model managing the routing of TCP/IP traffic between the NSPs and users.

DISCLOSURE OF INVENTION

The present invention provides a method for TCP/IP packet traffic bypass of the Internet Public Network Access Points by providing direct connections to an array of National Internet Service Providers and using a Provider's connection to route only those TCP/IP packets destined to or coming from destinations attached to said Provider.

In accordance with the principles of the present invention, there is provided a Private Network Access Point, referred to as a P-NAP. The P-NAP is a local network infrastructure which is connected to a plurality of NSPs and which provides Internet connectivity to any other entity needing direct access to these NSPs, their customers, and the Internet in general.

Software is resident in the P-NAP that implements a heuristic TCP/IP route management control method in which traffic sent to a connected NSP is, in most cases, for the sole purpose of communicating with a destination within the NSP. Conversely, traffic received from a connected NSP is, in most cases, for the sole purpose of a destination within the NSP communicating with a P-NAP customer. Known as symmetric routing because the forward and reverse traffic paths flow across the same NSP link, this is the basis for the bypass of the NAPs. In most cases, traffic is never sent to an NSP in which that NSP must turn around and send to another NSP via the NAPs. The same is true in the reverse; in most cases, NSPs will not send P-NAP destined traffic to other NSPs via the NAPs when they have their own direct connection back to the P-NAP.

In the event of failure of a P-NAP connection to one of its NSPs, the route management control method of the present invention uses a pre-determined, primary "default" NSP to route to destinations within the NSP of the failed connection. Should the primary "default" NSP be unavailable, traffic is routed to a secondary "default". Should the secondary "default" be unavailable, traffic is routed to a tertiary "default", and so on for all available NSPs in the predetermined order. These "default" NSPs are also used (in the same order and under the same conditions) for traffic routed to destinations not connected to any P-NAP NSP (which is the degenerative case of a failed P-NAP connection to one of its NSPs). In all cases of "default" NSP use, there is no longer a NAP bypass, but the traffic routing to/from the "default" NSP remains symmetric.

Thus, the P-NAP of the present invention provides a method for managing the traffic routing among the P-NAP users and NSPs without random route switching, without asymmetric routing, and allowing for a bypass of the public NAPs.

BRIEF DESCRIPTION OF THE DRAWINGS

For a fuller understanding of the present invention, reference is made to the accompanying drawing taken in conjunction with the following detailed description of the Best Mode For Carrying Out the Invention. In the drawing.

BEST MODE FOR CARRYING OUT THE INVENTION

Background

Given that the NAPs do not scale well and therefore can easily become overloaded, there are other aspects of today's Internet architecture which compound the performance problems of the NAPs.

First, the protocol BGP4 gives equal protocol configuration control to all entities exchanging routing information. Thus, no single entity has the ability to exert more control over its own routing than another entity has over its own routing, without cooperation among the two entities. Because most of these entities are competing against one another, there is little incentive to take the cooperative aspects beyond just peering with one another. Add to this the fact that there is no economic settlement between NSPs for the exchange of traffic at a NAP, and the result is both an economic and technical incentive on the part of an NSP to get rid of traffic at its closest NAP connection in common with the destination NSP rather than try to carry the traffic across its own backbone to another NAP. The same thing happens when the destination NSP returns a packet to the originating NSP.

Figure 1:
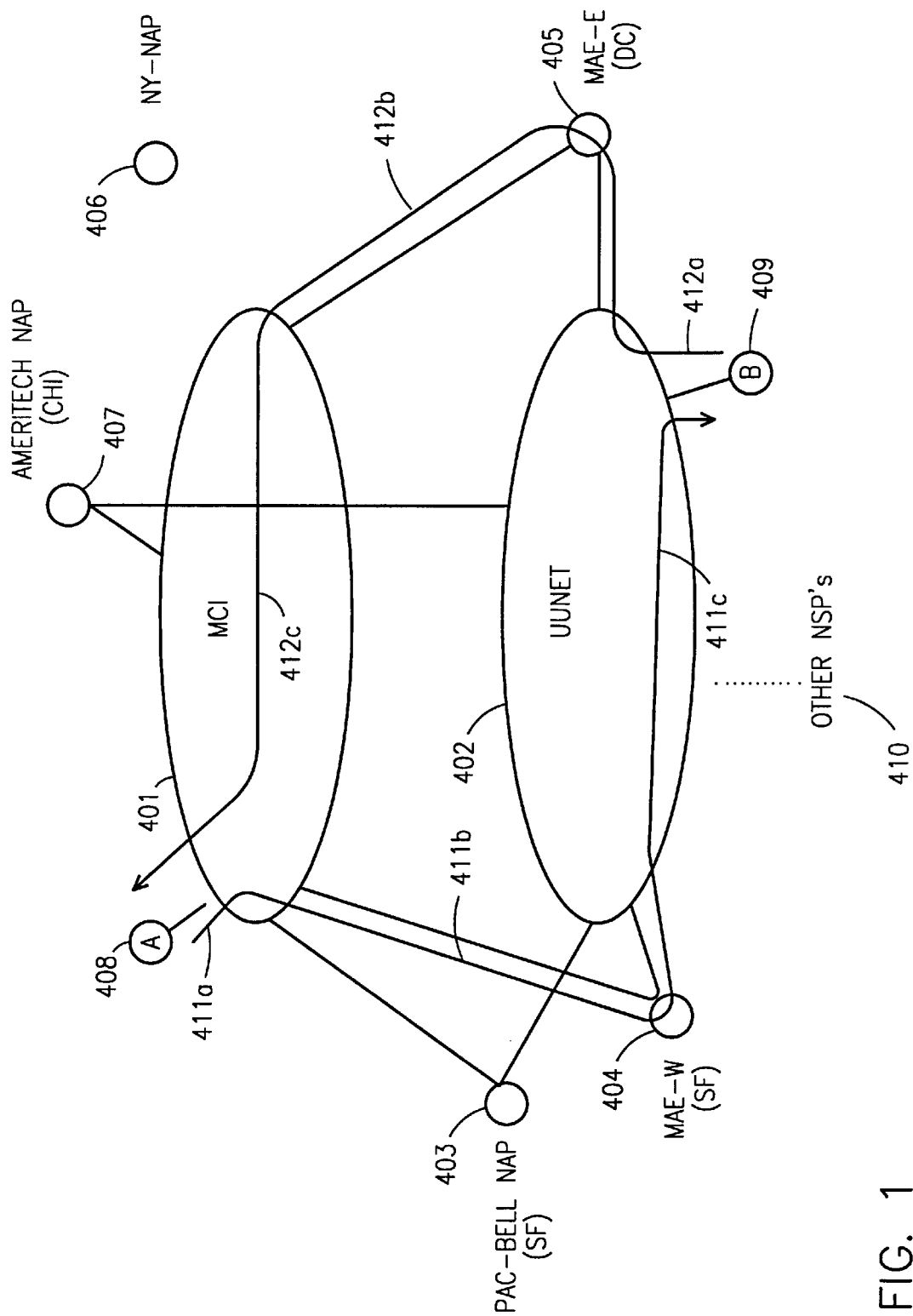
FIG. 1 is a diagram showing, at a very high level, interconnection of a plurality of NSPs to one another through public NAPs and the resulting asymmetric packet routing which occurs.

For example, FIG. 1 is a simplified depiction of Internet traffic exchange prior to the advent of the present invention. There is shown five public NAPs, Pac-Bell (SF) 403, MAE-West (SF) 404, MAE-East (DC) 405, NY (NY) 406 and Ameritech (Chi) 407, as well as a plurality of NSPs connected to them such as MCI 401, UUNet 402 and others 410. If a source A 408 that is a customer of MCI 401 wants to establish two-way communication with a destination B 409 which is a customer of UUNet 402, then in today's Internet, the traffic from the source A 408 to the destination B 409 will take one path 411 and the traffic from the destination B 409 back to the source A 408 will take another path 412. Each traffic path is divided into three sub-paths. For path 411, as stated above, MCI 401 has incentives to move the traffic off its network as soon as possible, so after source A 408 sends traffic over sub-path 411a to its provider MCI 401, MCI 401 sends the traffic over a second sub-path 411b to the closest NAP, in this example MAE-West (SF) 404 where it exchanges the traffic with UUNet 402, and UUNet 402 carries the traffic all the way across its backbone to destination B 409 over sub-path 411c. The path 412, as in the case for path 411, UUNet 402 has the same incentives as MCI 401 to move the traffic off its network as soon as possible, so after destination B 409 sends traffic over sub-path 412a to its provider UUNet 402, UUNet 402 sends the traffic over a second sub-path 412b to the closest NAP, in this example MAE-East (DC) 405 where it exchanges the traffic with MCI 401, and MCI 401 carries the traffic all the way back across its backbone to source A 408 over sub-path 412c.

This traffic flow phenomenon within the Internet is known as asymmetric routing because the forward and reverse traffic flows in any two-way communication are traversing separate paths. The paths are exactly opposite from the source to the destination. In the forward direction, the traffic goes from the source 408 to MCI 401 to a first NAP 404 to UUNet 402 which carries the traffic to the destination 409. In the reverse direction, the traffic goes from the destination 409 to UUNet 402 to a second NAP 405 to MCI 401 which carries the traffic back to the source A 408. This is also known as "hot potato" routing because each NSP is trying to rid its backbone of one-way traffic of a two-way flow by pushing as much traffic as possible at the closest NAP(s).

Asymmetric routing, in and of itself, is not a problem. The problem is that asymmetric routing causes traffic to traverse four separate entities that the source and destination really have little or no control over: MCI 401, UUNet 402, and two different NAPs 404, 405. The source A 408 may have a little bit of control over MCI 401 because the source A 408 is a customer of MCI 401. The same with the relationship of destination B 409 with its provider, UUNet 402. But neither the source A 408 nor the destination B 409 has any control over the other NSP or either of the two NAPs 404, 405 that the traffic must traverse. Thus the source A 408 and the destination B 409 don't have many ways to force the NAPs 404, 405 or the other NSPs to make their service better.

Secondly, the current NAP architecture creates problems when two entities in the same city or region are trying to communicate with one another, but they are customers of different NSPs. Again referring to FIG. 1, when source A 408 attached to MCI 401 and destination C 417 attached to UUNet 402, both in Seattle, Wash., want to communicate with one another, the traffic flows from source A 408 to destination C 417 via a NAP in San Francisco such as Pac Bell (SF) NAP 403. Not only does the traffic between two entities in the same city have to traverse an already congested NAP 403, the traffic must flow thousands of miles out of its way just to "cross the street".

Finally, the protocol BGP4 does not automatically concern itself with routing to/from a destination over a directly connected link when the source is connected to many different backbone NSPs such as MCI or UUNet. When an entity is connected to more than one NSP using BGP4 without the benefit of the technology and resulting protocol configurations of the present invention, packet routing can occur in a random fashion. It should be understood that the NSPs include a plurality of routers and a plurality of networks connected through the routers.

Networks contain destinations or unique IP addresses. A router has a plurality of unique IP addresses that identify it, one for each of its directly connected networks. When BGPr is used, a grouping of networks within an NSP is referred to as an Autonomous System or AS. The routers originate advertisements of their directly connected networks to other routers and other routers in turn forward those advertisements to more routers. The advertised routes can indicate distance in terms of a metric such as the number of "hops" to reach a destination. In BGP4, a "hop" is an AS that a route advertisement has traversed in its path of origination to current location. The number of BGP4 "hops" to reach a destination is the count of all ASes that a route has traversed from its originating point to the current point. Thus, a certain destination network might appear to be nearer or farther depending upon the different hop counts in route advertisements received from different NSPs. The BGP4 protocol is defined such that a router can only forward packets based on one advertised route. Thus, a router cannot forward packets to the same destination based on two different routing advertisements. To ensure that only one route is used at any time, a number of "tie breakers" were developed such that when two or more routes were considered "equal", there would be a way to automatically choose one. The BGP4 protocol has different attributes (the hop metric mentioned above is one type of BGP4 attribute) and there are a set of "tie breakers" for each different BGP4 attribute. If after all tie breakers are used, there are still two or more routes that are considered equal, the protocol BGP4 contains a "last chance" tie breaker. The method chosen is that the route coming from an advertising router with the higher IP address is better. This essentially makes the protocol BGP4 random in its choice of which route is best when confronted with the same route advertised by multiple NSPs. Thus, an entity which connects itself to many different providers using vanilla BGP4 can not guarantee that when trying to get to a destination on MCI it won't send first to UUNet and let UUNet send the traffic to MCI, in which case the traffic would have to traverse a NAP. Not only is this a function of the routing protocol, it is also a function of the way the different NSPs have set up their backbone routing.

Disclosure of Invention

In order to solve the performance problems inherent in today's NAP traffic exchange model, there is a need for a way to bypass the NAPs by giving sources and destinations direct access to one another without requiring that every source and destination be connected to the same NSP. Thus there is a need for a technology with an infrastructure connecting to a plurality of NSPs—the P-NAP, allowing customers to connect to the infrastructure and the infrastructure ensuring, at all times possible, that traffic from its sources is destined only to an NSP when the destination is attached to the NSP. The technology must also provide that traffic from destinations back to the sources flow across the same connection. This is a concept known as symmetric routing which, as explained above, is not inherent to the protocol BGP4.

Figure 2:
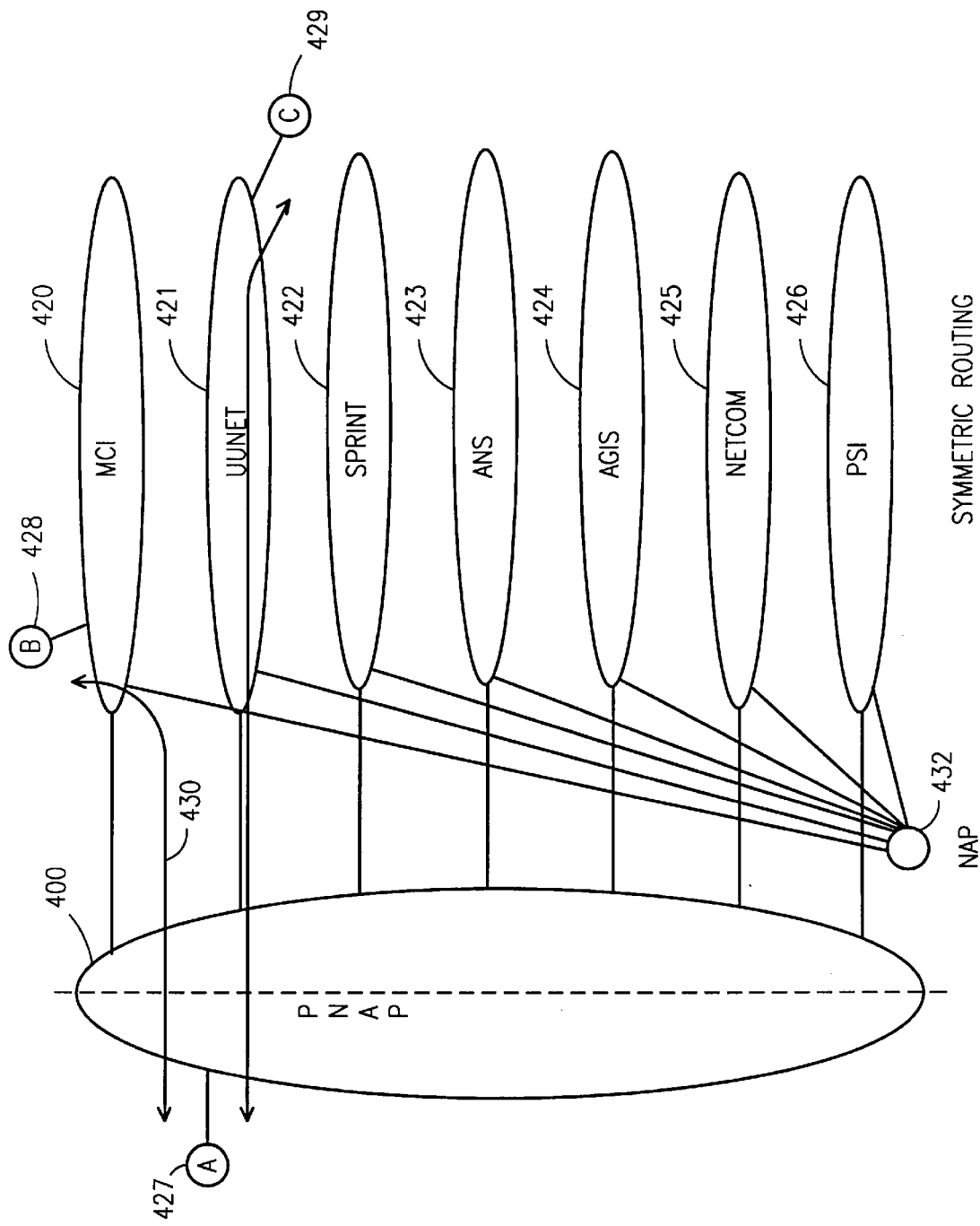
FIG. 2 is a diagram showing, at a very high level, a P-NAP in accordance with the invention connected to a plurality of P-NAP Providers and customers and the resulting symmetric packet routing which occurs.

Referring now to FIG. 2, there is shown a schematic representation of a P-NAP 100, having connections to seven NSPs, namely MCI 420, UUNet 421, Sprint 422, ANS 423, AGIS 424, Netcom 425, and PSI 426, known as P-NAP Providers 420–426, and a representation of it's customers, source A 427. Also, for clarity, FIG. 2 shows one of the five NAPs 432 and connections to it maintained by all of the NSPs. When source A 427 attached to the P-NAP 100 in Seattle wants to communicate with a destination B 428 attached to MCI 420, also in Seattle, the P-NAP 100 sends traffic directly out its connection 430 to MCI 420. Destination B 428 will send the traffic back to source A 427 over the same MCI connection 430. This also shows the localization aspects of the P-NAP 100 in that the traffic between source A 427 and destination B 428 stays in Seattle and doesn't have to traverse to a NAP in a different region.

The same traffic pattern (without the localization) will occur for source A 427 attached to the P-NAP 100 in Seattle and a destination C 429 attached to UUNet 421 in Atlanta. Source A 427 will send packet traffic to the P-NAP 100 and the P-NAP 100 will in turn send the traffic directly to UUNet 421 which will take the traffic across its backbone to destination C 429. Destination C 429 will send the traffic over the exact same path in reverse on the return path to source A 427.

Conceptually, the P-NAP 100 can be thought of as being made up of two halves. One half of the P-NAP 100 connects to customers such as source A 427 which want direct symmetric access to the P-NAP Providers 420–426, and the other half connects to the P-NAP Providers 420–426. The use of the P-NAP infrastructure and symmetric routing is for P-NAP customers only. Thus, the P-NAP Providers 420–426 do not use P-NAP infrastructure for exchanging traffic among themselves. The P-NAP Providers 420–426 exchange traffic with the P-NAP 100 for the sole purpose of routing traffic to or from a P-NAP customer such as source A 427.

Because the P-NAP 100 is connected to many different Providers 420–426, the P-NAP 100 with symmetric routing is inherently fault-tolerant. In the event of failure of any connection to a P-NAP Provider 420–426 or in the event that a destination is not connected to one of the P-NAP Providers 420–426, the symmetric routing technology allows the P-NAP 100 to route symmetrically across a "default" Provider to the destination. The "default" provider is a set of the P-NAP Providers 420–426 ordered in such a way that one is chosen to be the primary default. If the primary default fails, the secondary default takes over. If the primary and secondary default both fail, the tertiary default takes over and so on for all P-NAP Providers 420–426.

Thus, the P-NAP infrastructure, coupled with symmetric routing, solves the problem of needing the public NAPs 432 for two-way communication among sources and destinations, when at least one of the source or destination is connected to a P-NAP 100. Because the P-NAP technology is metropolitan based, it scales much better than the NAP architecture and provides localization of traffic and a level of fault-tolerance which is not found in today's NAP architecture.

The Invention

Figure 3:
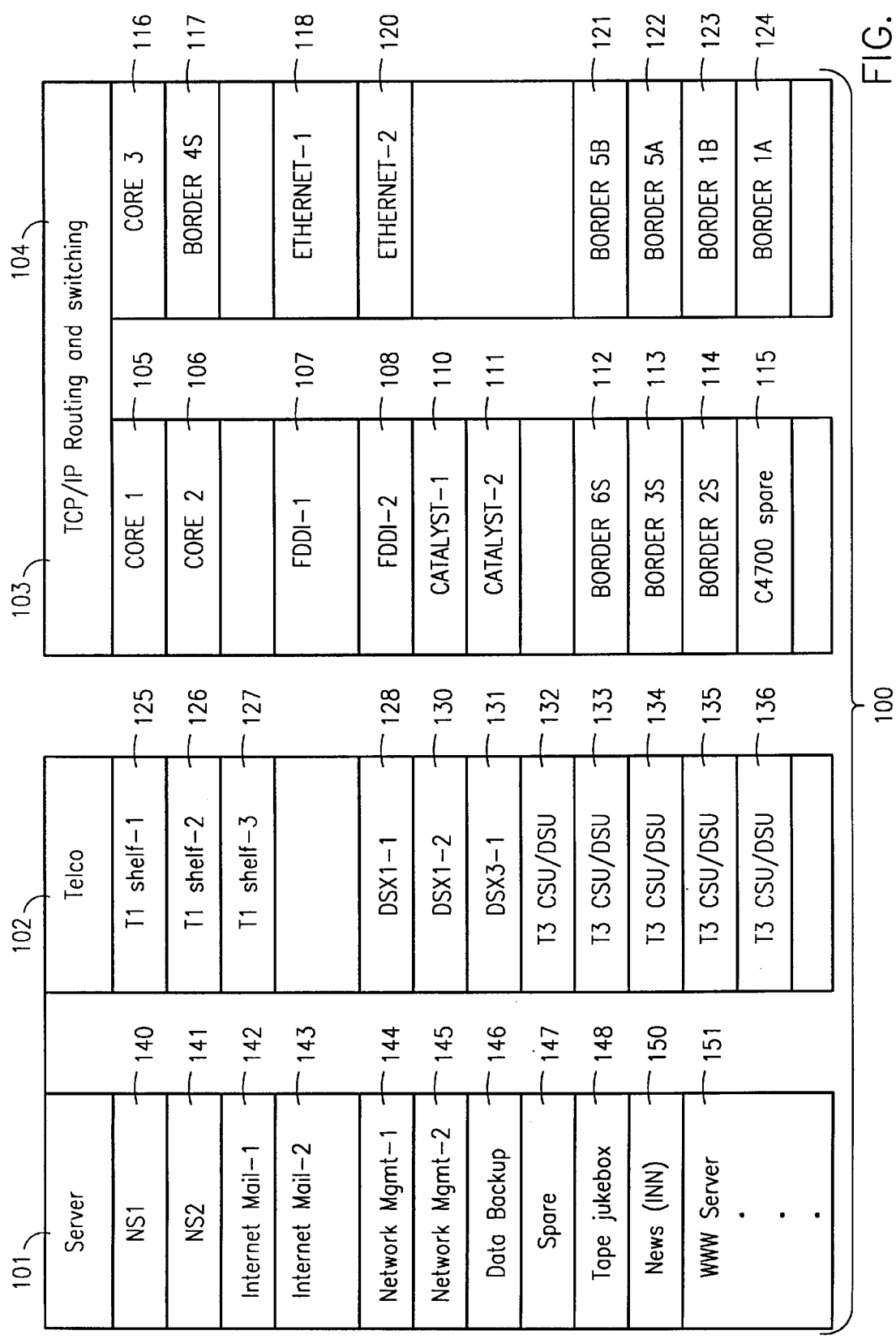
FIG. 3 is a front elevation view of hardware implementing a P-NAP and disposed in four racks of communication equipment.

Hardware for embodying a Private Network Access Point or P-NAP 100 in accordance with the principles of the present invention is illustrated in FIG. 3. The P-NAP 100 comprises four racks 101, 102, 103 and 104 filled with communications hardware. The second and third racks 103 and 104 contain TCP/IP switching and routing gear. The designation TCP/IP identifies the layer 3 network protocol conventionally used with the Internet. The third rack 103 contains two core routers 105 and 106, two FDDI concentrators 107 and 108, two catalyst switches 110 and 111, three border routers 112, 113 and 114, and a spare border router 115.

The upper core router 105 is referred to as core-1, while the lower core router 106 is referred to as core-2. In this particular embodiment, the core routers 105, 106 are identified as Cisco 7505-6E1F1H8T routers available from Cisco Systems, Inc., 170 W. Tasman Drive, San Jose, Calif. 95134. The upper FDDI concentrator 107 is known as FDDI-1, while the lower FDDI concentrator 108 is known as FDDI-2. The upper catalyst switch 110 is known as catalyst-1, while the lower catalyst switch 111, a spare, is known as catalyst-2. The FDDI concentrators 107, 108 and the catalyst switches 110, 111 are sold by Cisco Systems, Inc. The upper border router 112 is known as border-6S, the middle border router 113 is known as border-3S, and the lower border router 114 is known as border-2S. The middle and lower border router 113, 114 are identified as Cisco 4700-6E8T, while the upper border router 112 is identified as Cisco 7505-6E1F2H. The spare 115 is identified as a Cisco C4700-6E1F4T.

The fourth rack 104 contains a core router 116, a border router 117, two Ethernet Hubs 118, 120, and four more border routers 121–124. The core router 116 is known as core-3 and is the same as the other core routers 105, 106. The upper border router 117 is known as border-4S and is identified as Cisco 7505-6E1F2H. The upper Ethernet Hub 118 is known as Ethernet-1, while the lower Ethernet Hub 120 is known as Ethernet-2. The Ethernet Hubs 118, 120 are made by Hewlett-Packard of Palo Alto, Calif. Of the four border routers 121–124, the topmost border router 121 is known as border-5B, the next border router 122 is known as border-5A, the following border router 123 is known as border-1B, and the bottom border router 124 is known as border-1A. These border routers 121–124 are all identified as Cisco 4700-12E1F.

The second rack 102 contains three T1 CSU/DSU shelves 125, 126, 127, two DSX1 shelves 128, 130, one DSX3 shelf 131, and five or more T3 CSU/DSUs 132, 133, 134, 135, 136. The acronym CSU/DSU stands for Channel Service Unit/Data Service Unit. As is well known, the Telco T1 digital carrier system carries digital multiplexed channels at the DS1 data rate of 1.544 Mbps, while the T3 digital carrier system carries digital multiplexed channels at the DS3 data rate of 44.736 Mbps. In regard to the three T1 shelves 125, 126, 127, each shelf contains 12 T1 CSU/DSUs, 125a-1, 126a-1, and 127a-1. Each T1 CSU/DSU handles one T1 circuit. The T3 CSU/DSUs 132, 133, and 134 each handle one T3 circuit. In regard to the two DSX1 shelves 128, 130, each shelf handles 28 T1 circuits. The DSX3 shelf 131 handles 28 T3 circuits. All DSX shelves 128, 130, 131 perform the function of interface between the circuit carriers and the CSU/DSUs 125a-1, 126a-1, 127a-1, 132, 133, 134. From this point forward, it should be understood that a DSX cross-connect connection exists between any CSU/DSU and a T1 or T3 circuit. For simplicity, the DSX cross-connects are omitted from the drawings. As the number of circuits increases beyond the capacity of any of the equipment shown in FIG. 1, additional equipment of the appropriate type may be added to the racks 101–104 as required.

The first rack 101 contains servers. At the top is NS1 140, and below that is NS2 141, both being name servers using the Internet DNS protocol. DNS stands for the Domain Name System, which is a system that exists across the global Internet that allows any user to resolve the name of a remote machine to its IP address by using name servers that contain a domain name database. The next shelf is Internet Mail 1 142, and below it is its backup, Internet Mail 2 143. The next shelf is Network Management 1 144, followed by its backup, Network Management 2 145. The next shelf is called backup 146, which is a backup machine for protecting the data. The next shelf is a spare 147, which is a physical machine replacement for any of the servers 140–146. The next shelf is a tape machine called a tape jukebox 148. The backup 146 sends data to the tape jukebox 148, and the data backup tapes rotate through it. The next shelf is a news machine 150 for Internet Usenet News. The news machine 150 employs an Internet protocol called INN. At the bottom of the first rack 101 there are disposed a plurality of Internet World Wide Web (WWW) customer servers 151. It should be noted that as additional equipment and customer servers are deployed, there will be a need to add additional racks beyond these four racks 101–104.

It will be understood that support facilities are provided that are not shown in FIG. 3. The racks 101–104 are located in a room having a floor space of 1,800 square feet, known as the Internet Data Center, or IDC. The support facilities include two 20-ton Heating Ventilation and Air Conditioning (HVAC) systems, one being a spare that automatically switches on if the primary system fails. The two HVACs are rotated on a weekly basis. There is also a 50 KVA Uninterruptible Power Supply (UPS). Both the UPS and HVAC are connected to a motor generator which automatically switches on if there is a main power failure to provide power for the UPS and the HVAC system. The four racks 101–104 are mounted on a raised floor that is provided with an under-floor ladder rack which facilitates wire runs between them. Fire protection for the racks 101–104 is provided. There is a dry fire protection system that uses Halon, which is backed up by a wet fire protection pre-action system.

Wire conduits are provided from the IDC to a "meet-me room" where connections can be made to all of the different circuit carriers co-located in the same building. These provide for T1 connections as well as T3 connections. A meet-me room allows the system of the present invention to make cable runs to one central place. All circuit carriers take their wire to the same central place. Then, everyone cross-connects amongst each other in that single centrally located place. This avoids having to run spaghetti wire all over the building, and it allows the system to meet all the NSPs at a single place in the building without having to purchase circuits to a remote location.

Figure 4:
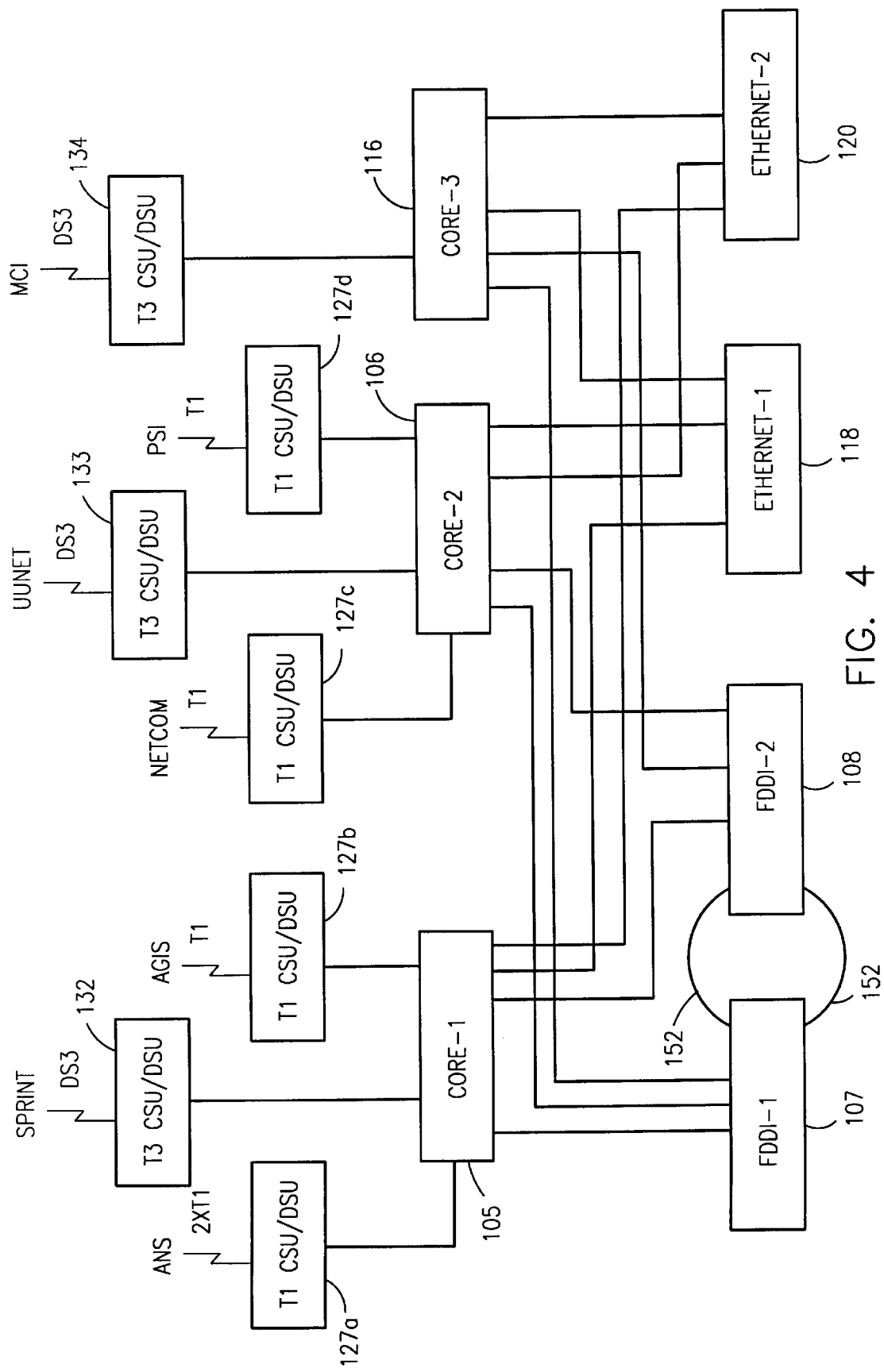
FIG. 4. is a block diagram showing in part the connection of core routers to interface the P-NAP to NSPs in the outside world of the Internet.

At the physical connection level, FIG. 4 shows in block diagram form the heart of the connectivity of the P-NAP 100 to the outside world of the Internet via the NSPs known as the P-NAP Providers. The backbone of the P-NAP is one 100 Mbps shared FDDI LAN with two 100 Mbps Ethernet LANs used as redundant backup for the FDDI. The core routers connect to all three backbone LANs.

FDDI (Fiber Distributed Data Interface) is a LAN or Local Area Network technology that provides 100 Mbps bandwidth over optical fiber and also provides self-healing capabilities. FDDI is a dual, counter-rotating token ring technology. The network forms two cycles (rings), starting at one computer, passing through all other computers and ending back at the source. A token is passed between computers in a ring to control transmission by signaling that the system currently holding the token may transmit or receive data. Within one ring, all tokens flow in the clockwise direction and within the other ring, all tokens flow in the counter-clockwise direction. Only one of the rings is used in a fully functioning FDDI network. The other ring is only used if a system is unable to transmit the token to the next system on the primary ring. In this case, the system noticing the transmission problem will "wrap" the token to the secondary (opposite direction) ring in an effort to route around the problem on the primary ring. The token may flow back (on the secondary ring) to systems which have already seen it, but because the token is on the secondary ring, they will eventually forward the token to systems which haven't yet received it.

FDDI has two physical connection methods. In the first, known as "daisy-chaining", computer A connects directly to computer B which connects directly to computer C and computer C connects back to computer A, forming the cycle discussed above. To add additional computers, the cycle must be broken to insert the new computer between A and B or B and C or C and A. The second method is known as the "concentrated" method. Two FDDI concentrators are used to make up the primary and secondary rings. Each computer, rather than connecting to another computer, connects to both concentrators. The two concentrators in turn are dually connected to one another and handle the token passing among the different systems and different rings. Even though each computer is connected to two different concentrators in this method, the FDDI is still thought of as a single LAN. The concentrated method does not need a ring break in order to add new computers and it better isolates computers from one another. In FIG. 4, FDDI-1 107 and FDDI-2 108 are the two FDDI concentrators and are dually connected to one another as indicated at 152.

Ethernet is a LAN technology which provides 10 Mbps bandwidth over twisted-pair cable (10BaseT Ethernet) or coax cable (10Base2/5 Ethernet). Ethernet is not a self-healing technology as is FDDI. 10BaseT Ethernet uses a physical device known as a "hub" to connect devices to one another. In FIG. 4, Ethernet-1 118 and Ethernet-2 120 are two separate Ethernet hubs, forming two Ethernet LANs. Using TCP/IP internal routing technology, the FDDI LAN is the primary backbone over which all traffic flows and the Ethernet LANs (together, for a total of 20 Mbps) are used as backup in case of failure of the FDDI. For example, in the event of a failure of a router's FDDI interface, that router will begin using the two Ethernet LANs to transit traffic. In the event of failure of one of the FDDI concentrators 107, 108, the redundant nature of FDDI will put all traffic on the other FDDI concentrator. But, in the event of failure of both of the FDDI concentrators 107, 108, TCP/IP routing will cause the two Ethernet LANs to be used as backup. The system can be expanded to include additional Ethernets as needed for backup.

Core-1 105, Core-2 106 and Core-3 116 are each connected to FDDI-1 107, FDDI-2 108, Ethernet-1 118 and Ethernet-2 120. Each core router, Core-1 105, Core-2 106 and Core-3 116 also connect to the P-NAP Providers (NSPs to which the P-NAP has chosen to connect). For redundancy among providers, the P-NAP architecture only allows one DS3 connection on each core router so that if one core router fails, there are still two other core routers with DS3 connections which continue to function. The same is true for T1 connections in that they are spread among the core routers rather than all concentrated into a single core router. In FIG. 4, the service providers are indicated by a WAN symbol that represents a lightning bolt. The WAN lightning bolt symbols are identified by the names of the service providers placed adjacent thereto, and the data rate is indicated as being at either the DS3 rate or some multiple of the T1 rate. Core-1 105 is connected to T3 CSU/DSU 132, which is then connected to Sprint. Core-1 105 is also connected to T1 CSU/DSU 127*a* which connects to ANS and T1 CSU/DSU 127*b* which connects to AGIS. Core-2 106 is connected to T3 CSU/DSU 133, which is then connected to UUNet. Core-2 106 is also connected to T1 CSU/DSU 127*c* which connects to Netcom and T1 CSU/DSU 127*d* which connects to PSI. Core-3 116 is connected to T3 CSU/DSU 134 which is then connected to MCI. It should be noted that if current T1 connections need to be upgraded to DS3 or a DS3 is required to an NSP which does not currently exist in the P-NAP fabric, there will need to be an additional core router and an additional CSU/DSU for each DS3 connection. That core router will be connected to the P-NAP backbone in the same manner as all other core routers and the DS3 connection will be connected to the NSP in the same manner as all other DS3 connections. For additional T1 provider connections, additional T1 CSU/DSUs will be needed, but these connections will continue to be spread out among all of the core routers (each core router can handle up to six T1 connections).

The foregoing description of the block diagram of FIG. 4 is a description at the lowest or actual-connection level of the connectivity of the P-NAP to its providers. Refer to FIG. 2 to see diagrammatically the same thing as FIG. 4, but at a much higher level.

In the preferred embodiment of the present invention, there are three ways that an entity can connect to the P-NAP: 1) via servers on a dedicated access LAN; 2) via servers on a shared access LAN; and 3) via remote connectivity circuits. Servers on a LAN refers to customer servers which are physically located on the premises of the P-NAP facility, attached to a LAN. Remote connectivity refers to connecting a circuit from the customer's office to the P-NAP.

Figure 5:
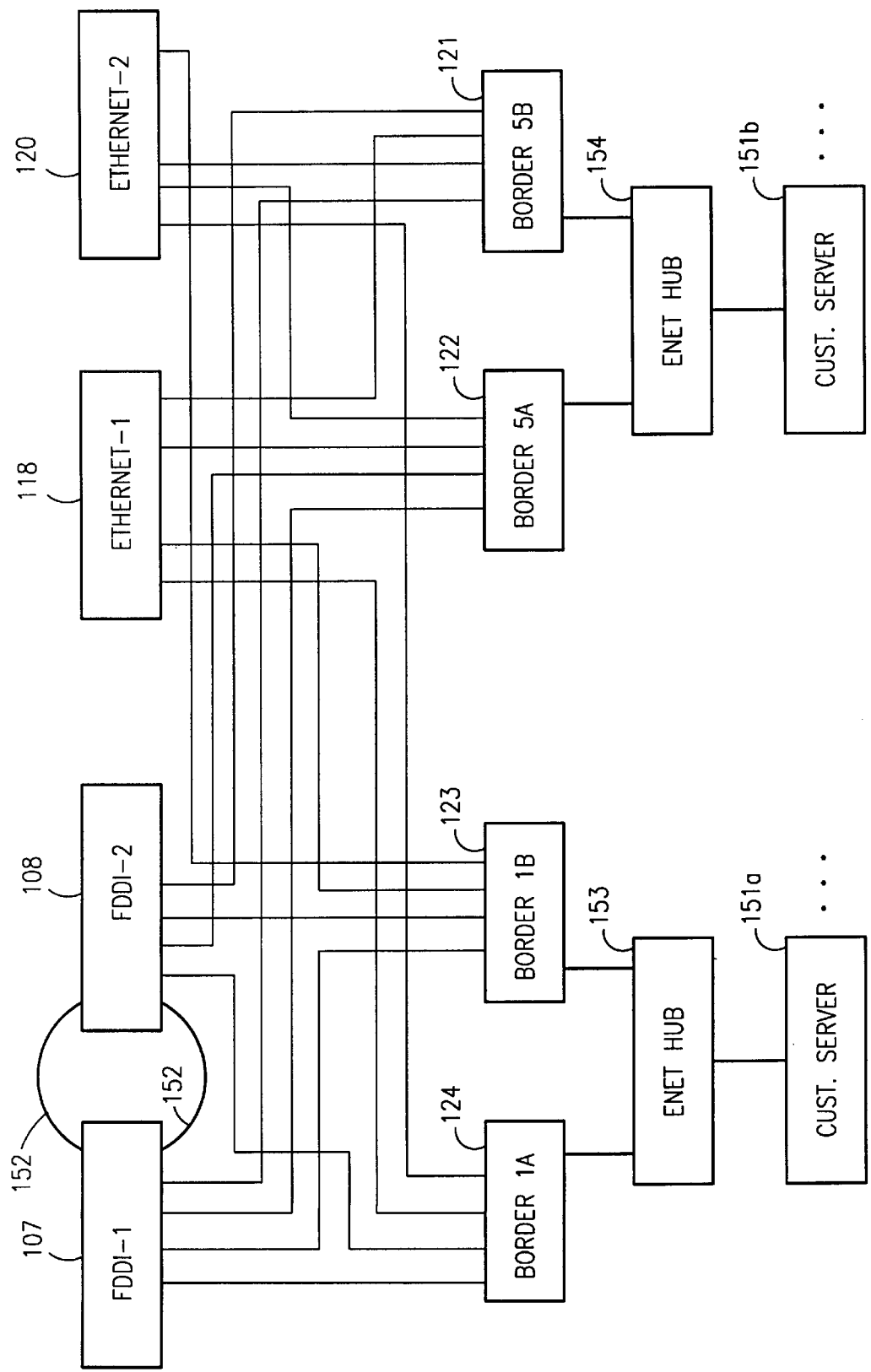
FIG. 5 is a simplified block diagram showing customer servers connected by dedicated access LANs to the P-NAP of the present invention.

Referring now to FIG. 5, in conjunction with FIG. 4, there is illustrated in block diagram form the first of these ways that customer servers 151 are connected to the P-NAP, namely, via a dedicated access LAN. The FDDI-1 107, FDDI-2 108, Ethernet-1 118 and Ethernet-2 120 from the bottom of FIG. 4 are shown at the top of FIG. 5. Below these LANs are shown four border routers: border 1A 124, border 1B 123, border 5A 122 and border 5B 121. These four border routers work in pairs for redundancy's sake (1A with 1B, and 5A with 5B, known as A/B pairs). The two members of a pair actually operate at the same time. That is, the pairs work in parallel together, but should one router of a pair fail, the other router takes over and does what the failed router was doing. This all happens automatically, and is in accord with the redundancy dictated by standard protocols.

Border 1A 124 is connected to each of the LAN units: FDDI-1 107, FDDI-2 108, Ethernet-1 118 and Ethernet-2 120. Similarly, border 1B 123, border 5A, 122 and border 5B 121 are also connected to each of the LAN units. A first Ethernet hub 153 is connected to border 1A 124 and to border 1B 123. This Ethernet hub 153 is not shown in FIG. 3, but is a unit manufactured by Asante of San Jose, Calif., for use with individual servers. Any number of customer servers 151a are connected to the Ethernet hub 153. Similarly, a second Asante Ethernet hub 154 is connected to Ethernet-1 122 and to Ethernet-2 121. Any number of customer servers 151b are connected to the Ethernet hub 154.

Figure 6:
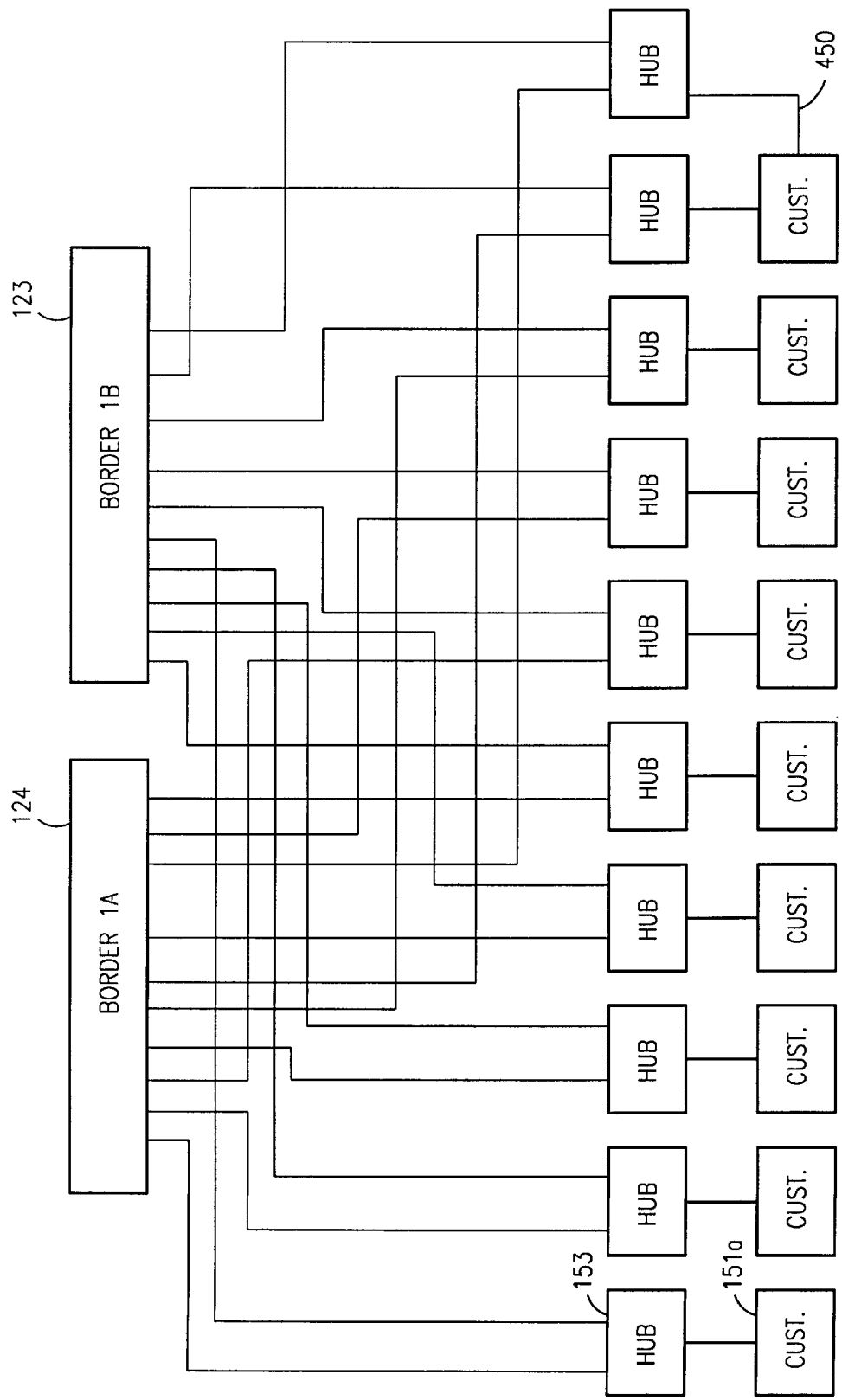
FIG. 6 is a block diagram showing multiple dedicated access LANs connected to the P-NAP of the present invention.

Referring now to FIG. 6, each router pair actually has ten customer connections. That is, the router pair identified as border 1A 124 and border 1B 123 has the capacity to handle ten customer servers through ten Ethernet hubs, as shown in FIG. 6. In a similar manner, the second router pair identified as border 5A and border 5B also has the capacity to handle ten customer servers through ten Ethernet hubs. Should additional customer handling capacity be needed, additional router pairs may be added as required, and connected to the LAN units FDDI-1 107, FDDI-2 108, Ethernet-1 118 and Ethernet-2 120.

No redundancy is provided for the Ethernet hubs 153, 154. The Ethernet hub is a single point of failure, but it is a low level wiring device, and has very little to it. However, if the customer is willing to pay the price, redundancy can be provided. This option is implemented by putting another connection on the back side of the customer server that connects to another one of the ten dedicated LANs. If one LAN fails, the added connection will provide connectivity for the customer server. This type of connection 450 is illustrated in FIG. 6. This is strictly an economic issue for the customer.

Figure 7:
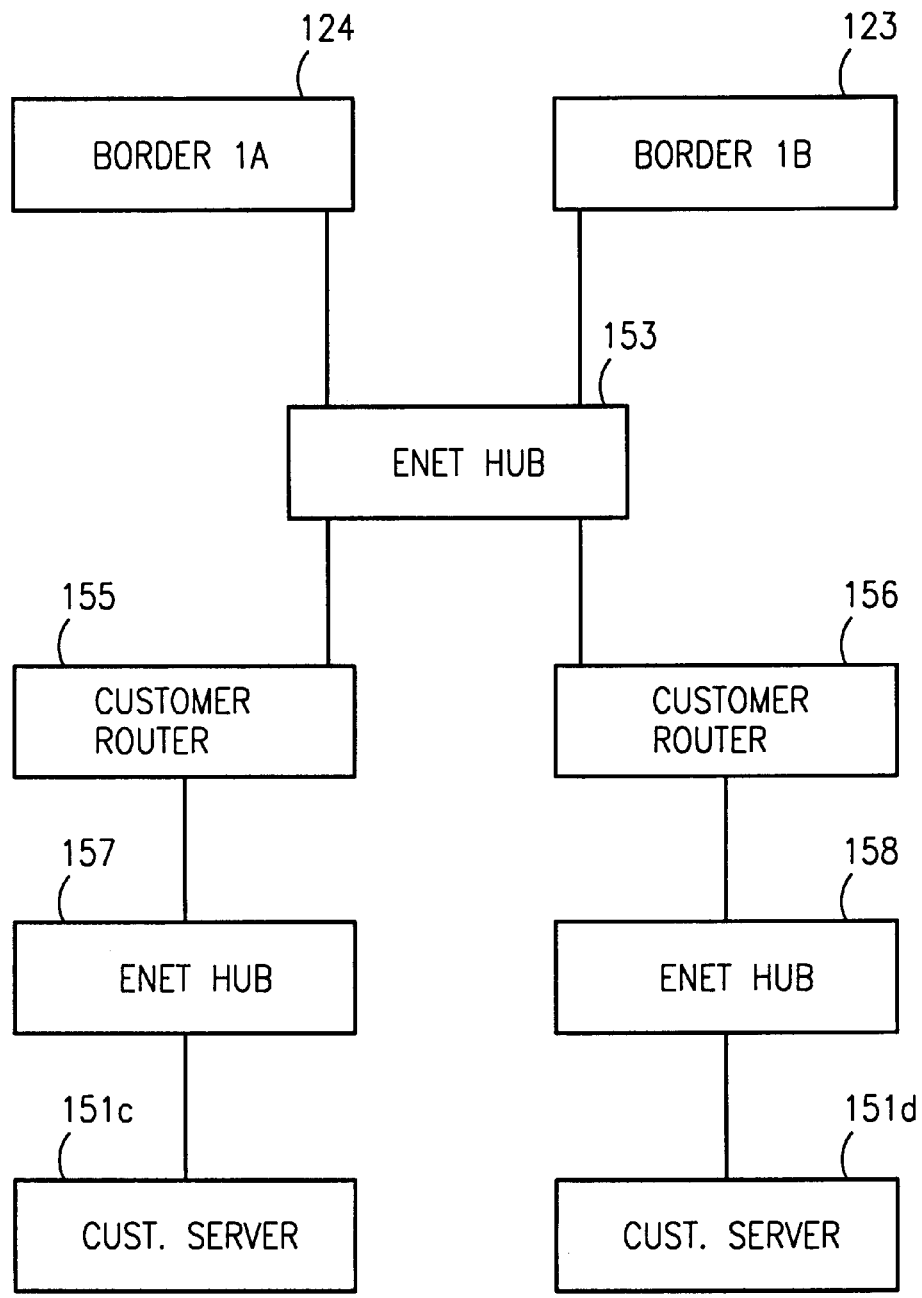
FIG. 7 is a block diagram showing shared access connection of customer servers to the P-NAP of the present invention.

In regard to FIGS. 5 and 6, the type of service depicted is referred to as dedicated access because only one customer entity has its customer servers 151a connected to the Asante Ethernet hub 153. In FIG. 7, on the other hand, there is shown an example of a shared access LAN. In FIG. 7 two servers 151c, 151d of two different customers share one Asante Ethernet hub 153 connected to the border router pair. In order to do this, it is necessary to provide a separation so that one customer cannot see the other customer's traffic. The two customer servers 151c, 151d cannot just be connected to the Asante Ethernet hub 153. Accordingly, the Ethernet hub 153 is connected to two customer routers 155, 156, each of which is in turn connected to another Asante Ethernet hub 157, 158. The customer routers 155, 156 are, in the preferred embodiment, two Cisco Model 2514 routers. These provide what is known as "firewall" protection to the two customers that share the first Ethernet hub 153. Thus, the firewall router is a physical separation device. The one customer no longer sees the other customer's traffic, and vice versa. It should be noted that the shared access LAN is just one of the dedicated LANs, but with many different customers. To this end, there can be as many shared access LANs as needed by just converting a dedicated access LAN.

Figure 8:
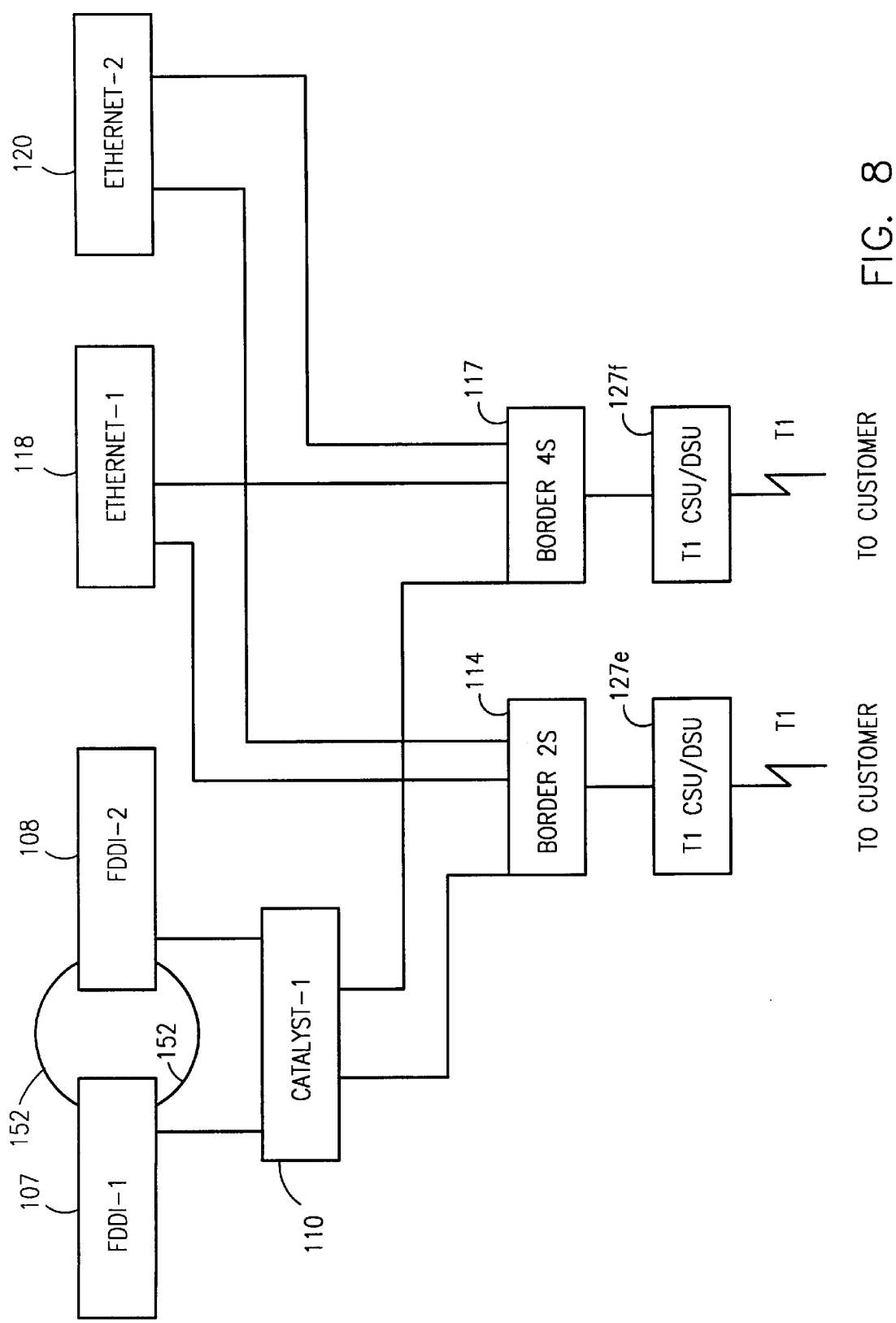
FIG. 8 is a block diagram showing remote connectivity from the P-NAP of the present invention via T1 lines to customer servers located on customer premises.

The dedicated access connections and the shared access connections have been described hereinabove. The remote connectivity access to customer servers located on the customer premises will now be described with reference to FIGS. 8 and 9. FIG. 8 shows remote connectivity access from the P-NAP of the present invention via T1 lines to the customer servers, while FIG. 9 shows remote connectivity access from the P-NAP via T3 lines to the customer servers.

Referring to FIG. 8, Catalyst-1 110 is connected to FDDI-1 107 and FDDI-2 108 (Catalyst-2 111 is an unconnected spare). The Catalyst switch acts as a bridge between Ethernet and FDDI (translating Ethernet frames to FDDI frames and back) so that T1 remote connectivity border routers don't have to have FDDI interfaces (thus allowing more space for T1 serial interfaces). Catalyst-1 110 and Catalyst-2 111 are each Cisco Catalyst 1200-8E1F LAN switches. The border routers identified as Border 2S 114 and Border 4S 117 are connected via Ethernet interface to Catalyst-1 110 and via Ethernet interfaces to Ethernet-1 118 and Ethernet-2 120. T1 CSU/DSU cards from the T1 CSU/DSU shelves 127, 126, 125 connect to Border 2S and Border 4S as they themselves get connected via circuits to the customer premises. Each of these border routers can handle eight T1 remote connectivity connections (of which only one connection to each router is shown in FIG. 8). As connections beyond the total number afforded by Border 2S and Border 4S are needed, additional border routers of this type may be added to the P-NAP as required.

Figure 9:
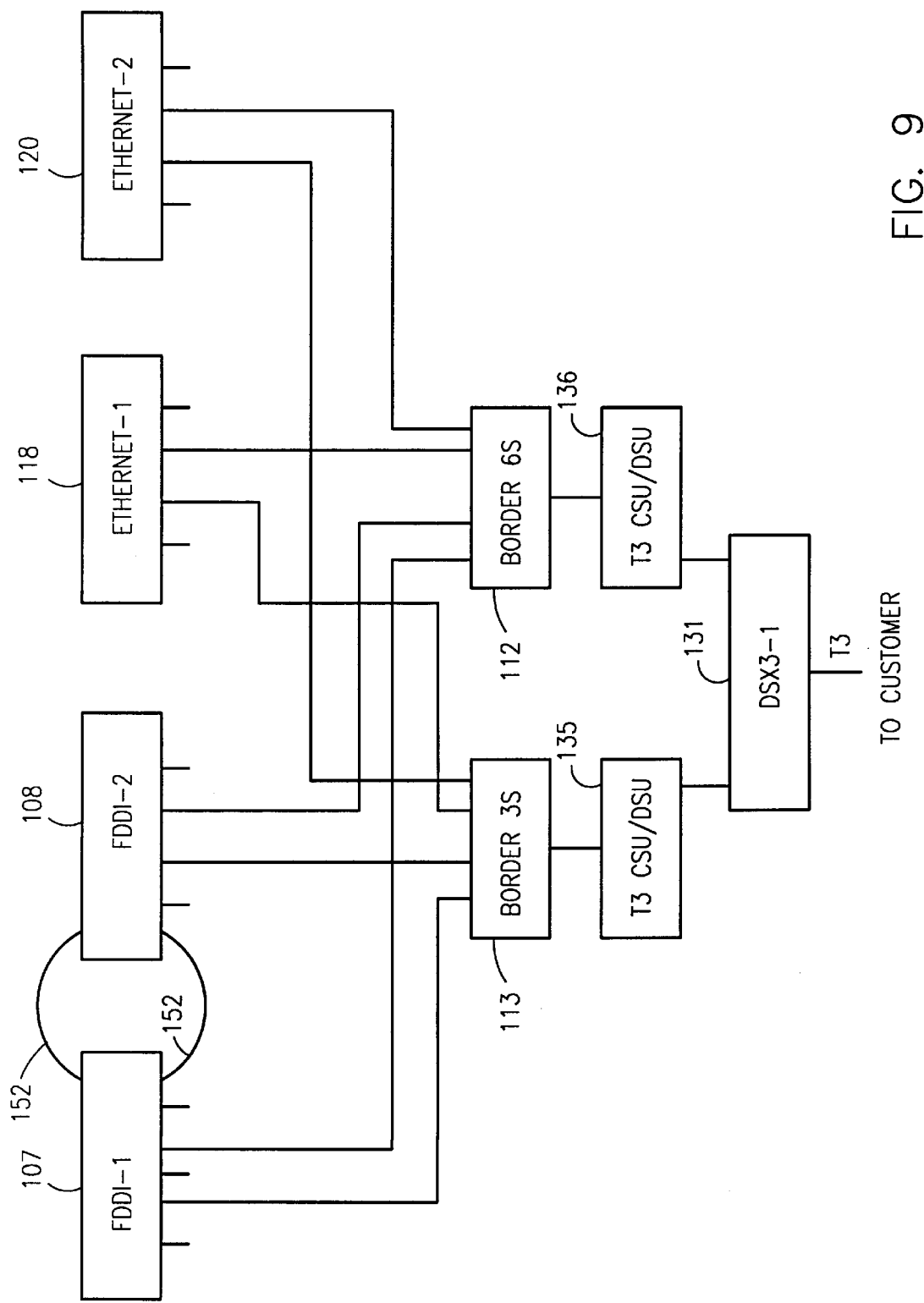
FIG. 9 is a block diagram showing remote connectivity from the P-NAP of the present invention via T3 lines to customer servers located on customer premises.

Referring now to FIG. 9, there is shown a block diagram of remote connectivity from the P-NAP of the present invention via DS3 circuits to customer servers located on the customer premises. The border router identified as Border 3S 113 and the border router identified as Border 6S 112 are each connected to FDDI-1 107, FDDI-2 108, Ethernet-1 118 and Ethernet-2 120. Additional T3 CSU/DSUs such as 135, 136 connect to either Border 3S 113 or Border 6S 112 (as shown T3 CSU/DSU 135 connects to Border 3S 113 and T3 CSU/DSU 136 connects to Border 6S 112). The T3 CSU/DSUs are then connected via circuits to customer premises. Each of these border routers can handle two DS3 remote connectivity connections (of which only one connection to each of the routers is shown in FIG. 9). As connections beyond the total number afforded by Border 3S and Border 6S are needed, additional border routers of this type may be added to the P-NAP as required.

It should be understood that these border routers 112, 113, 114, 117 do not work in pairs as did the A/B routers described hereinbefore. These routers 112, 113, 114, 117 work individually. If a remote connectivity customer wants redundancy of the type afforded by dedicated and shared connectivity customers, the remote connectivity customer must arrange for a second remote connectivity circuit to the P-NAP which will be terminated into a different border router. Thus, this second circuit will provide redundancy because it is different from any other circuit that customer has connected to the P-NAP. The "S" in Border 2S, Border 4S, Border 3S and Border 6S stands for "serial" because it is called a serial type connection.

It will be understood that the network management servers 144, 145 in the first rack 101 shown in FIG. 3 are connected to one of the dedicated LANs 153 (described previously in connection with FIGS. 5 & 6). There are no customer servers attached to this dedicated LAN 153. P-NAP resident software for execution of various processes in accordance with the invention is disposed in the network management servers 144, 145.

This software, known as ASsimilator, implements portions of a heuristic TCP/IP route management control process which ensures that traffic between an entity connected to the P-NAP and another entity connected (either directly or indirectly) to a P-NAP Provider, only traverses the P-NAP connection to the P-NAP Provider. As described previously, this is known as symmetric routing because both the forward and reverse traffic paths follow the same route through providers. Should the P-NAP connection to the P-NAP Provider be currently unavailable or should the other entity not be connected to a P-NAP Provider, the route management control process of the invention causes the traffic to flow symmetrically across one of the P-NAP Providers currently configured as primary "default". With the redundancy that is built into the P-NAP, the current "default" may change to other P-NAP Providers based on the availability of the current "default" Provider.

ASsimilator comprises three major aspects: 1) determination of routing policy configuration; 2) software which develops and automatically maintains routing databases; and 3) working with P-NAP Providers to set their BGP4 LOCAL_PREF attribute to prefer access to the P-NAP via their local connection to the P-NAP rather than via another P-NAP Provider (through the Public NAPs). LOCAL_PREF is a BGP attribute which gives the local Autonomous System (AS) control over preference of packet routing. This LOCAL_PREF attribute is attached to routes through the AS's router configurations. By definition, a higher LOCAL_PREF value is more preferred than a lower LOCAL_PREF value.

The function of aspect number 1 is to determine a preference ordering of P-NAP Providers to be used in the "default" case discussed above. Determination needs to be made which P-NAP Provider will act as the "primary" default, which will act as "secondary" default, which will act as the "tertiary" default and so on for all P-NAP Providers. Once this determination is made, then ASsimilator processes can be used to create base router configurations which work with other processes in ensuring that traffic between the P-NAP and an entity not connected to a P-NAP Provider or an entity connected to a P-NAP Provider where the provider circuit is currently unavailable, is routed symmetrically across the current "default" Provider. Aspect number 1 is also needed to route symmetrically to destinations attached to more than one P-NAP.

The function of aspect number 2 is to create and maintain databases of Autonomous System numbers (AS numbers, used in BGP4 to distinguish one routing entity from another) associated with each P-NAP Provider as well as AS numbers of providers which are believed to be currently peering at the Public NAPs. There are two methods by which these databases are updated: 1) an ASsimilator process and associated software; and 2) path verification software known as Routebot. Given these databases and the entire Internet routing table advertised by each P-NAP Provider, it is possible to determine which of the routes advertised by each provider are actually connected to each provider while maintaining the redundancy and symmetric routing aspects described in connection with aspect number 1 above. It must be understood that from each P-NAP Provider, the P-NAP will receive not only that Provider's routes, but also the routes of all other providers (including those other providers also connected to the P-NAP), with no automated way of distinguishing the provider's own routes from those of all other providers. Given this ability to determine a P-NAP Provider's own routes from the entire Internet routing table, aspect number 2 is the basis for controlling the routing from the P-NAP to a P-NAP Provider over the P-NAP Provider connection for only those destinations within the P-NAP Provider's network.

Determining which providers are peering at the Public NAPs is where the heuristic techniques of ASsimilator are employed. From a BGP4 routing perspective, there is no way to tell the difference between an entity peering with a provider over a NAP and that same entity buying service from that provider directly. Since the NAPs are layer 2 architectures, the NAPs are invisible from a layer 3 TCP/IP routing perspective. Thus, a NAP does not appear in BGP4 routing advertisements, making peering at a NAP look the same as direct connections. Currently, ASsimilator assumes that if an entity is connected to more than three NSPs, then the entity is peering with the NSPs across the NAPs. This heuristic is based upon the assumption that there are few, if any, entities other than the P-NAP which are directly connected to more than three NSPs. This does cause problems though, with those entities which are peering at the NAPs but with only three or fewer providers. ASsimilator provides a technique to manually update the databases to cover cases such as this which are found to exist.

The function of aspect number 3 is to cause each P-NAP Provider to set it's BGP4 LOCAL_PREF attribute such that any P-NAP routes a provider receives over its connection to the P-NAP are preferred over P-NAP routes received from other providers over peering agreements at the NAPs. This is the basis for controlling the routing from networks connected to the P-NAP Provider back to the P-NAP over the P-NAP Provider connection.

Figure 10:
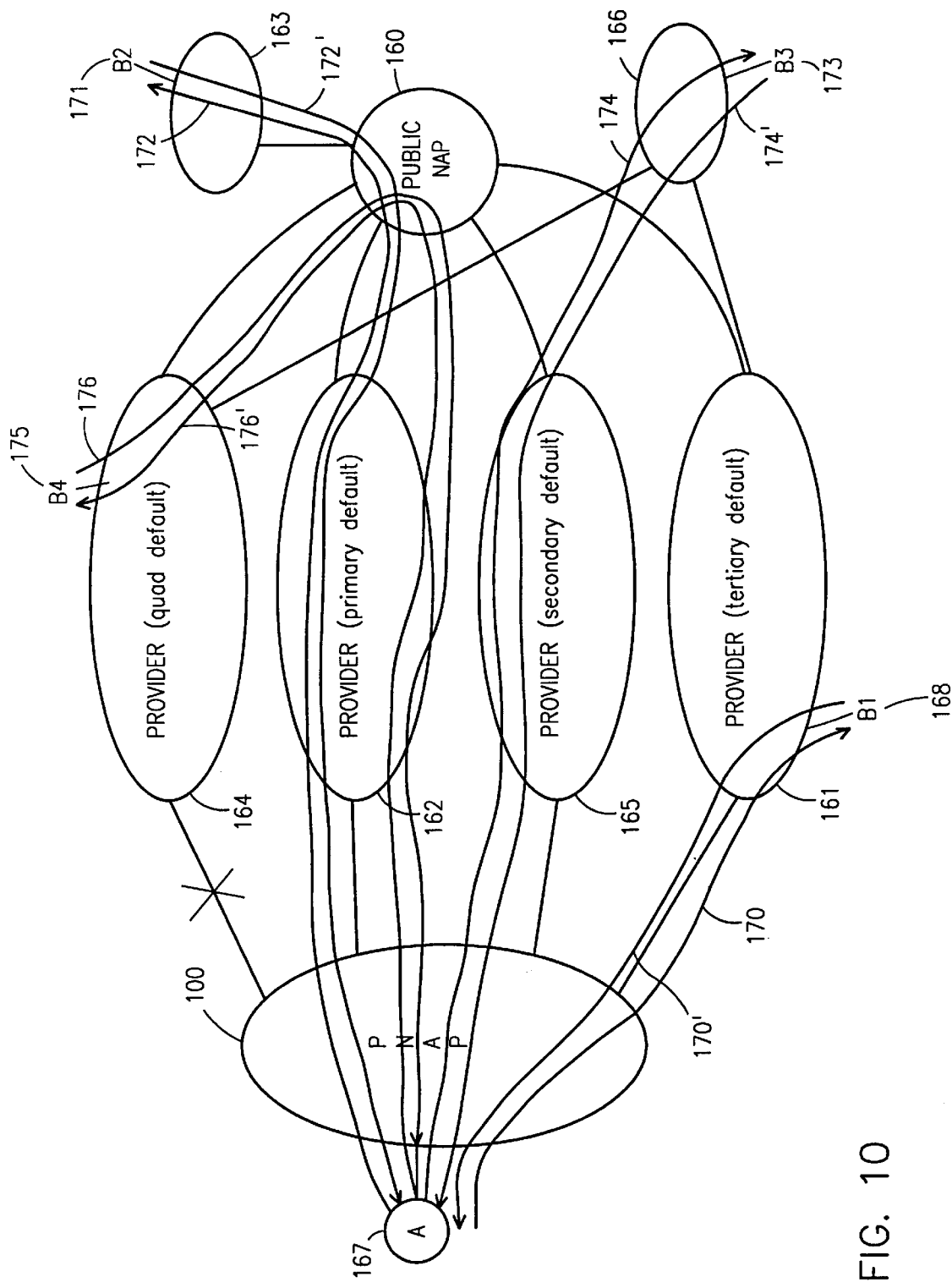
FIG. 10 is a schematic representation of a routing diagram of the P-NAP and its connections to P-NAP Providers indicating the methods for exchanging packets in forward and reverse directions between node A and node B.

Referring now to FIG. 10, there is shown a simplified schematic representation of a routing diagram of the P-NAP's relationship to the global Internet indicating the interconnections of various routing paths. There is shown a P-NAP 100, a public NAP 160 and six administrative routing entities 161–166. Four of the entities, 161, 162, 164 and 165 are NSPs connected directly to the P-NAP 100, and therefore may be thought of as P-NAP Providers. Entities 163 and 166 could be NSPs, ISPs, or a corporation with a very large network. These will be referred to as just entities. The four Providers 161, 162, 164, 165 are labeled as being ordered in terms of their position in the chain of "default" as described above: primary, secondary, tertiary, etc. In FIG. 10 it is shown that the circuit between the P-NAP 100 and Provider 164 is currently unavailable. This is indicated by a large "X" in the connection. Three of the four Providers 161, 165, and 164 are also connected to entity 166. The four Providers 161, 162, 164 and 165 as well as entity 163 connect directly to the public NAP 160.

The P-NAP 100 of the present invention routes packets between a customer of the P-NAP and a customer of any provider in a symmetric fashion such as to bypass the public NAPs such as NAP 160 whenever possible. Specifically, in a first case, the P-NAP 100 creates configuration files which when applied to the core routers 105, 106 and 116 (see FIGS. 3 and 4) use the BGP4 LOCAL PREF attribute to cause the P-NAP 100 to route to the P-NAP Provider's customers over that provider's network. This is illustrated in FIG. 10 by a source A 167 which is a customer of the P-NAP 100 wanting to exchange packets with a destination B1 168 which is a customer of P-NAP Provider 161. The forward packet goes via a first routing path 170 directly to the Provider 161 and directly to destination B1 168. At the P-NAP 100, when the connection to Provider 161 was created, the local preference of Provider 161 was set for causing Provider 161 to prefer direct routing to the P-NAP 100, rather than routing via a public NAP like NAP 160. Thus, when the destination B1 168 sends the return packet to the source A 167, the return packet travels via the first routing path 170' from destination B1 168 and Provider 161 directly to the P-NAP 100 and to the source A 167.

In a second case, the P-NAP 100 creates configuration files which use local preferences and varying AS path lengths of routes advertised to each P-NAP Provider to route over the "default" P-NAP Provider's network to customers not connected to any P-NAP Provider. This is illustrated in FIG. 10 by the source A 167 which is a customer of the P-NAP 100 wanting to exchange packets with a destination B2 171 which is a customer of the entity 163 which is not connected to the P-NAP 100 directly. Provider 162 is pre-selected by the P-NAP 100 as being the current "default" because it is listed as "primary" and it is currently available. The forward packet goes via a second routing path 172 via Provider 162, the public NAP 160 and the entity 163 to the destination B2 171. Because the routes back to the P-NAP that entity 163 receives from Provider 162 have the shortest AS path length (Provider 162 is the primary default and therefore has the shortest AS path length of all P-NAP Providers), the return packet travels via the symmetric second routing path 172' via the entity 163, the public NAP 160 and Provider 162 to the P-NAP 100 and source A 167.

In a third case, the P-NAP 100 creates configuration files which use local preferences and varying AS path lengths to route to customers with connections to more than one provider in common with the P-NAP 100 over the customer's P-NAP Provider which is highest in the order of "default" P-NAP Providers. This is illustrated in FIG. 10 by the source A 167 which is a customer of the P-NAP 100 wanting to exchange packets with a destination B3 173 which is a customer of the entity 166 which is connected to P-NAP Providers 161, 164 and 165. Because Provider 165 is the highest in the "default" order (secondary) among the three common P-NAP Providers 161, 164 and 165, it is selected as the symmetric path that packets will follow. The forward packet goes via a third routing path 174 via Provider 165 directly to entity 166 and to destination B3 173. Because routes back to the P-NAP 100 that entity 166 receives from Provider 165 have the shortest AS path length of the three Providers 161, 164 and 165 to which entity 166 is connected (Provider 165 is secondary "default", thus of all P-NAP Providers, in common with entity 166, Provider 165 has the second shortest AS path length), the return packet travels via the symmetric third routing path 174' via the entity 166, Provider 165 and the P-NAP 100 back to source A 167.

In a fourth case, the P-NAP 100 creates configuration files which use local preferences and varying AS path lengths to cause the P-NAP 100 to route to customers of P-NAP Providers over the current "default" P-NAP Provider when the destination Provider connection to the P-NAP 100 is currently unavailable. Unavailable in this case means the circuit or routing relationship between the P-NAP 100 and the P-NAP Provider has failed. This is illustrated in FIG. 10 by the source A 167 and a customer of the P-NAP 100 wanting to exchange packets with a destination B4 175 which is a customer of the P-NAP Provider 164, but the connection between the P-NAP 100 and P-NAP Provider 164 is currently unavailable. In this case, because there is no direct connection at this time between the P-NAP 100 and P-NAP Provider 164, this case degenerates to the second case described above. Provider 162 is pre-selected by the P-NAP 100 as being the current "default" because it is listed as "primary" and it is currently available. The forward packet goes via a fourth routing path 176 via Provider 162, the public NAP 160 and the P-NAP Provider 164 to the destination B4 175. Because P-NAP routes currently received by P-NAP Provider 164 from P-NAP Provider 162 over the public NAP 160 have the shortest AS path length (Provider 162 is the primary default and therefore has the shortest AS path length of all P-NAP Providers), the return packet travels via the symmetric fourth routing path 176' via Provider 164, the public NAP 160 and Provider 162 to the P-NAP 100 and the source A 167.

The second and fourth cases above are the only two cases where traffic must traverse the public NAP 160. Thus, the more P-NAP Providers, the less often the public NAPs will have to be traversed.

As may be seen from the foregoing, in accordance with the principles of the present invention, there is provided a method for routing packets symmetrically among a P-NAP 100 and at least two P-NAP Providers connected to the P-NAP 100. For the outgoing packet, it may be seen that the P-NAP 100 creates routing configuration files which when applied to routers, use local preferences to cause the P-NAP 100 to route to the P-NAP Provider's customers over that provider's network. Furthermore, these same router configuration files cause the P-NAP 100 to route over a pre-selected "default" provider's network to customers not directly connected to a P-NAP Provider or to customer's of a P-NAP Provider when the P-NAP's connection to the Provider is currently down. For returning incoming packets of customers of P-NAP Providers, the P-NAP process sets the P-NAP Provider's local preferences, at connection setup, to prefer direct routing to the P-NAP 100. For returning incoming packets of all other destinations, the P-NAP 100 uses differing AS path lengths to each of the P-NAP Providers to cause the return path to coincide across the same P-NAP Provider as that which is chosen as the current "default" provider as described above. The method of the present invention includes the steps of applying the configuration files to a router, causing the router to obtain routes from each P-NAP Provider, and causing the router to apply the configuration files to the routes received.

Figure 11:
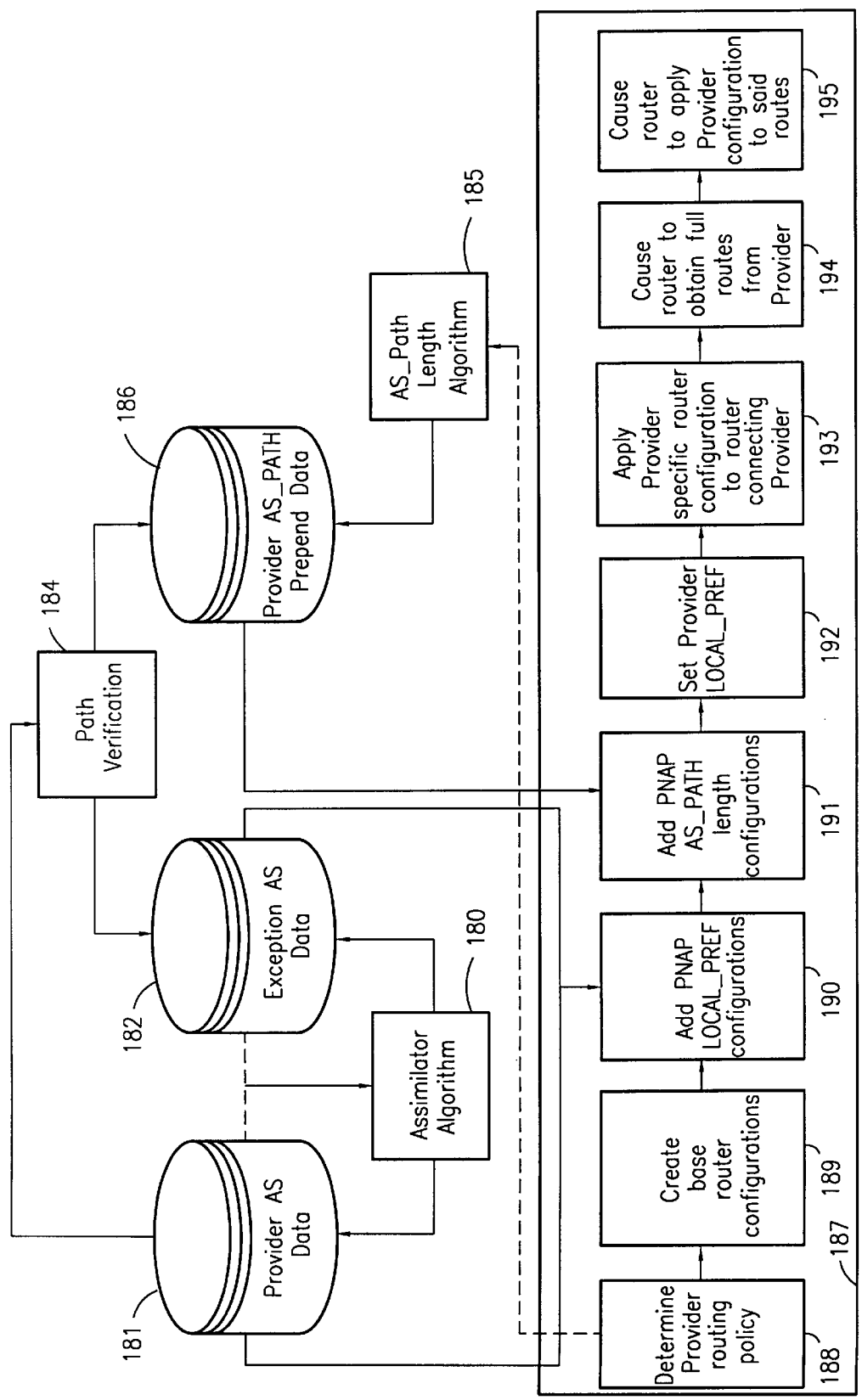
FIG. 11 is a flow chart in accordance with the principles of the present invention indicating steps to achieve symmetric P-NAP routing in an Internet system such as that shown in FIG. 10.

Referring now to FIG. 11, there is shown a flow chart indicating method steps to achieve symmetric P-NAP routing in an Internet system such as that shown in FIG. 10. It will be understood that each provider contains networks, and that each network contains destinations, typically computers. Routers connect networks to one another and connect providers to one another. An administrative grouping of any number of networks within a provider is described by a routing term known as Autonomous System, or AS. An Autonomous System may be as small as a single local area network or as large as many long haul networks. Each AS has a unique AS number that serves to identify it and each provider has its own distinct set of AS numbers. There is never a case where two different providers use the same AS number. We have previously described the entities in FIG. 10 as NSPs, providers and general entities. We will now also refer to those same entities as collections of Autonomous Systems (or ASes). In BGP4 routing, routers advertise routes to destinations on the Internet with what is known as an AS path (the AS_PATH attribute of BGP4) attached to each route. An AS path is the path of Autonomous Systems that a routing advertisement traverses from the point at which it is originated to the point at which the route advertisement is received. In most cases this can be equated to the same path a packet would take if originated at the point the route advertisement was received and destined for the point at which the route advertisement was originated.

FIG. 11 in its entirety shows the ASsimilator process which is part of the P-NAP. The ASsimilator process should not be confused with the Assimilator Algorithm 180. The Assimilator Algorithm 180 is the primary algorithm used by the ASsimilator process. The ASsimilator process of FIG. 11 actually consists of two main software applications: ASsimilator and Routebot. Routebot is responsible for Path Verification application 184. ASsimilator handles the remaining automated steps of FIG. 11.

At least twice a day, minimum, the ASsimilator application retrieves data it has already fed into its Provider AS Data database 181, verifies that the data is still valid and runs its algorithm to determine if any additional data should be added to the Provider AS Data database 181. The Provider AS Data database 181 is a mapping of P-NAP Providers to Provider AS numbers which is located on network management server 144 of FIG. 3. This database may look something like the following:

---

Sprint:

1239 1785 1790 1791 1792 1793 1794 1795 400 4001 4002 4003 4004 4005 6174 6175 6176 6177 1800 1789 1784 6449 6637 3650 3651 3652 3972 3973 4950 4951 6153 6154 6242 3447 7882 4000 4999 6367 1801 5778 7308
MCI 3561 4286 4281 4282 4283 4284 4285 4286 4287 4288 4289 4290 4291 4292 4293 4294 4295 4296 4297 4298 145 3378
UUNet:

701 705 702 7046 814 816
ANS:

1673 1321 1326 1327 1328 1329 1330 1331 1332 1333 1334 1662 1671 1322 1323 1660 1335 1667 1670 1672 1674 1675 1683 1686 1687 1694 1324 1325 1665 1677
PSI:

174 1280 2554 8013
AGIS:

4200 4993
Netcom:

2551 6996

---

Each time the ASsimilator is run it also re-creates that portion of the Exception AS Data database 182 which it previously created. The Exception AS Database 182 is a listing of those AS numbers which appear to be originating from more than three different P-NAP Providers, and is also located on network management server 144 of FIG. 3. As described above, this is the heuristic mechanism by which the invention determines that an entity is connected to the public NAPs and is peering with P-NAP Providers. Thus, the Exception AS Data 182 is an approximation of those ASes which peer at the public NAPs. This database 182 may look something like the following:

---

Exceptions:

2685 1 3914 568 6456 5761 4136 6113 286 6172 293 297 2041 4006 1740
3703 2828

---

The Exception AS Data database can also have a number of "manual" entries which are added via the Path Verification application 184 described below, or added by humans when automated mechanisms still do not correctly determine all exception AS numbers. A good example of this is an AS which is really at a NAP, but from the ASsimilator heuristic appears to have purchased direct connectivity from three NSPs. The ASsimilator and Path Verification application 184 would not be able to tell that this AS was at a NAP. Humans, though, are able to look at some indications and know that this AS is located at a NAP.

The Path Verification application 184, known as Routebot, updates both the Provider AS Data database 181 and the Exception AS Data database 182 when it determines that the ASsimilator heuristics fail to produce symmetric routing. Routebot runs every five minutes. Routebot's Path Verification application 184 is accomplished through the use of "traceroute". A traceroute is a TCP/IP mechanism to determine a path (current at the time of the traceroute) that a packet takes from its source to the destination. The traceroute does not determine the path back from the destination to the source. A second traceroute using the destination as a source back to the original source as a destination is required. The traceroute path contains each of the "hops" or TCP/IP routers which a packet must traverse. The Path Verification application 184, then, is able to look at the path from source to destination and back to determine if the routing is symmetric. If it is not, the Path Verification application 184 may be able to determine if an AS number should be added or deleted from the Exception AS Data database 182 to ensure that the packet routing will be symmetric when the AS data is reloaded into the routers.

Given the Provider AS Data database 181 and the Exception AS Data database 182, it is possible to determine which route advertisements from each P-NAP Provider is associated with the provider's customers. This is done by taking the union of the two databases 181, 182 and for each provider, remove that provider's AS numbers from the union and then apply the resulting AS list to routes only advertised by that provider. The application of the AS list to routes is done in such a way that routes not matching any of the ASes in the resulting list are considered to be routes of the provider.

As a simplified example, let's assume that we want to determine all of the customer routes of Provider A. Consider the following fictional Provider AS Data database:
Provider A
1 2
Provider B
3
Provider C
4 5

Also consider the following fictional Exception AS Data database:
Exceptions
6 7

As stated above, we take the union of these two databases, which gives us the following list of AS numbers:
1 2 3 4 5 6 7

Then, we remove the AS numbers of the provider whose routes we are trying to determine. In this case, we remove the AS numbers of Provider A, resulting in the following AS list:
3 4 5 6 7

Now, given the following routes advertised to the P-NAP by Provider A and their associated AS paths:
Route R1: 1 6 13 17
Route R2: 1 2 19 21
Route R3: 1 4

Notice that every route from Provider A terminates (in BGP routing the terminating AS is the left-most AS number, the origin is the right-most AS number) with one of Provider A's AS numbers as found in the Provider AS Data database. This is why it is not possible to simply filter on the directly connected AS number of each provider to determine that provider's routes, because that provider is advertising the entire Internet routing table, and all of the routes terminate with the Provider's AS number.

Now, apply the resulting AS list to each of the routes in such a way that a route is not considered to be part of Provider A if it contains an AS number which is in the resulting AS list. This is known as "denying" the routes. Any routes not denied are considered to be customers of the provider. Thus, Route R1 is denied because its AS path contains "6" which is in the resulting AS list. Route R3 is denied because its AS path contains "4" which is in the resulting AS list. Route R3 is accepted because there are no AS numbers in its path which match the resulting AS list.

There is another algorithm which can be applied to routes from each particular provider which uses a different set of databases. Instead of taking the union of Provider AS numbers and Exceptions, subtracting the current provider AS numbers and then denying the routes which match this list, the alternate algorithm creates a list of the AS numbers of each provider (our current Provider AS Data database 181) and any AS numbers peering with each provider and then permits (accepts) any routes from the provider which match this list. Because the second component (AS numbers peering with each provider) changes on a very regular basis, the second algorithm must be run more often than the first algorithm described to be effective. The first algorithm is the one which is currently in use.

Referring back to FIG. 10, the ability to determine which routes from each Provider are those of each Provider's customers ensures that packets will flow from source A 167 to destination B1 168 over B1's Provider NSP 161.

Referring again to FIG. 11, there is provided an AS_PATH Length Algorithm 185 which feeds data into a Provider AS_PATH Prepend Data database 186 located on network management server 144 of FIG. 3. The AS path length of routes advertised by the P-NAP to its providers is one of the protocol attributes that is adjusted in accordance with the principles of the invention to achieve symmetric P-NAP routing such as that shown in FIG. 10. Specifically referring back to FIG. 10, AS path modifications ensure that routing from destination B2 171 back to source A 167 flows across the same path as that from source A 167 to destination B2 171. Modifications to the AS path length is a way of increasing and decreasing a destination's "distance" from the P-NAP through each of the P-NAP Providers. In this case, distance is defined as the number of ASes in the AS_PATH of a BGP4 route advertisement. For example, the destination may see the P-NAP as having a distance 10 from MCI, a distance 7 from Sprint and a distance 5 from UUNet, selecting to take the path with the lowest distance; UUNet in this example. If a destination sees all paths back to the P-NAP as having the same distance, then there is no control over which path the traffic will follow. In order to ensure that there is control over traffic flow back to the P-NAP and achieve symmetric routing, it is necessary to artificially increase the AS path of routes advertised by the P-NAP to each of its providers in such a way that the ordering of "default" providers as described above for traffic to a destination is the same for traffic back to the P-NAP from that same destination. For each P-NAP Provider, this is achieved by prepending (adding distance) a potentially different number of the P-NAP's own AS numbers to routes advertised to each Provider in such a way that when the destinations not connected to a P-NAP Provider receive the routes, those routes from the P-NAP's current "default" provider will have the shortest AS path length. Thus, in accordance with the principles of the invention, symmetric routing has been achieved.

Given that an ordering of "default" P-NAP Providers has been pre-determined, the AS_PATH Length Algorithm 185 figures out the quantity of P-NAP AS numbers to attach to the routing advertisements sent to each provider. Each provider will have its own number of P-NAP AS numbers which must be attached to routes sent to that provider. The Provider AS_PATH Prepend Data database 186 may look something like the following:

UUNet (primary default)
0 AS additions
Sprint (secondary default)
1 AS addition
MCI (tertiary default)
3 AS additions
ANS (quad default)
4 AS additions
AGIS
5 AS additions
Netcom
6 AS additions
PSI
7 AS additions Referring again to FIG. 11, a rectangle 187 encompasses a series of blocks representing a series of steps in a flow chart illustrating the operations necessary to achieve symmetric routing in the P-NAP of the present invention. A first step 188 is the step of determining provider routing policy. It will be understood that the P-NAP must operate within a set of policy guidelines and routing strategy that is consistent with accepted practices within the Internet Protocol Suite. There exists a routing policy plan or document that sets forth such policy guidelines.

The first step 188 in the flow chart of determining provider routing policy involves developing these guidelines. In terms of the P-NAP of present invention, the primary routing policy guideline which must be determined is the order of "default" providers, from primary to secondary to tertiary and so on for all P-NAP Providers. Based on this ordering, two different LOCAL_PREF (local preference) values will be attached to each provider. It will be understood that within the BGP4 protocol, a LOCAL_PREF attribute is a number that, if not specifically set, will default to 100. The higher the LOCAL_PREF attribute attached to a route from a particular location, the more preferred the route.

The first set of LOCAL_PREF values are the values attached to routes which the present invention determines are directly connected to that specific Provider. The second set of LOCAL_PREF values are assigned to routes which are sent by that Provider, but are found to not be directly connected to the provider. These routes become the "default" routes. The second set of LOCAL_PREF values must begin at a value lower than the lowest values in the first set. The first set of LOCAL_PREF values are in decreasing order because, as described above in connection with FIG. 10, when a destination is attached to two P-NAP Providers, we want to choose the P-NAP Provider which is highest in the order. The second set of LOCAL_PREF values are in decreasing order because, as described above in connection with FIG. 10, when a destination is not attached to a P-NAP Provider, we want to choose the "default" P-NAP Provider which is highest in the order.

The ordered list and associated LOCAL_PREF values may look like the following:

| Order | Provider | LOCAL PREF | LOCAL PREF |
|---|---|---|---|
| 1. | UUNet | 100 | 75 |
| 2. | Sprint | 99 | 50 |
| 3. | MCI | 98 | 25 |
| 4. | ANS | 95 | 20 |
| 5. | AGIS | 90 | 15 |
| 6. | Netcom | 85 | 10 |
| 7. | PSI | 80 | 5 |

The first LOCAL_PREF column above is the LOCAL_PREF attribute assigned to those routes which are found to be directly connected to each provider. The second or rightmost LOCAL_PREF column above is the LOCAL_PREF attribute assigned to all other routes from each provider.

This ordering is then used by the AS_PATH Length Algorithm 185 to determine the appropriate number of AS additions to be sent with routes to each P-NAP Provider and therefore control the inbound routing to the P-NAP.

Additional routing policy implementation which is not specifically related to the invention includes items such as: 1) The use of BGP version 4; 2) Do not send or receive the Internet default route (0.0.0.0) to/from any P-NAP Provider; and 3) Do not send P-NAP Providers routes received from other P-NAP Providers.

A second step 189 in the flow chart of FIG. 11 is responsible for creating the necessary "base" router configurations for each P-NAP Provider. These base configurations (base configurations plus additional configuration added by the processes of the present invention) are located on network management server 144 of FIG. 1 as well as in the respective routers 105, 106 and 116. A base configuration for a particular P-NAP Provider will only be located on the router to which that P-NAP Provider connects. The primary purpose of this step is to translate the routing policy guidelines of the first step 188 into appropriate router configuration commands. Where appropriate, flags will be added to the base router configurations to tie the base configurations into the added configuration commands of further steps.

The base router configurations which implement the above routing policy guidelines may look as follows for each P-NAP Provider:

```
UUNet
router bgp 6993
    neighbor 137.39.136.137 remote-as 701
    neighbor 137.39.136.137 version 4
    neighbor 137.39.136.137 distribute-list 1 out
    neighbor 137.39.136.137 filter-list 10 out
    neighbor 137.39.136.137 distribute-list 1 in
    neighbor 137.39.136.137 route-map UUNET-LOCAL-PREF in
route-map UUNET-LOCAL-PREF permit 10
    match as-path <Filled in by third step 190>
    set local-pref <Filled in by first step 188>
route-map UUNET-LOCAL-PREF permit 20
    match as-path 1
    set local-pref <Filled in by first step 188>
Sprint
router bgp 6993
    neighbor 144.228.96.13 remote-as 1239
    neighbor 144.228.96.13 version 4
    neighbor 144.228.96.13 distribute-list 1 out
    neighbor 144.228.96.13 route-map SPRINT-ASPATH-PREPEND out
    neighbor 144.228.96.13 distribute-list 1 in
    neighbor 144.228.96.13 route-map SPRINT-LOCAL-PREF in
route-map SPRINT-ASPATH-PREPEND permit 10
    match as-path 10
    set as-path prepend <Filled in by fourth step 191>
route-map SPRINT-LOCAL-PREF permit 10
    match as-path <Filled in by third step 190>
    set local-pref <Filled in by first step 188>
route-map SPRINT-LOCAL-PREF permit 20
    match as-path 1
    set local-pref <Filled in by first step 188>
MCI
router bgp 6993
    neighbor 204.70.233.5 remote-as 3561
    neighbor 204.70.233.5 distribute-list 1 out
    neighbor 204.70.233.5 route-map MCI-ASPATH-PREPEND out
    neighbor 204.70.233.5 distribute-list 1 in
    neighbor 204.70.233.5 route-map MCI-LOCAL-PREF in
route-map MCI-ASPATH-PREPEND permit 10
    match as-path 10
    set as-path prepend <Filled in by fourth step 191>
route-map MCI-LOCAL-PREF permit 10
    match as-path <Filled in by third step 190>
    set local-pref <Filled in by first step 188>
route-map MCI-LOCAL-PREF permit 20
    match as-path 1
    set local-pref <Filled in by first step 188>
ANS
router bgp 6993
    neighbor 199.221.63.89 remote-as 1331
    neighbor 199.221.63.89 version 4
    neighbor 199.221.63.89 distribute-list 1 out
    neighbor 199.221.63.89 route-map ANS-ASPATH-PREPEND out
    neighbor 199.221.63.89 distribute-list 1 in
    neighbor 199.221.63.89 route-map ANS-LOCAL-PREF in
route-map ANS-ASPATH-PREPEND permit 10
    match as-path 10
    set as-path prepend <Filled in by fourth step 191>
route-map ANS-LOCAL-PREF permit 10
    match as-path <Filled in by third step 190>
    set local-pref <Filled in by first step 188>
route-map ANS-LOCAL-PREF permit 20
    match as-path 1
    set local-pref <Filled in by first step 188>
AGIS
router bgp 6993
    neighbor 206.250.249.9 remote-as 4200
    neighbor 206.250.249.9 version 4
    neighbor 206.250.249.9 distribute-list 1 out
    neighbor 206.250.249.9 route-map AGIS-ASPATH-PREPEND out
    neighbor 206.250.249.9 distribute-list 1 in
    neighbor 206.250.249.9 route-map AGIS-LOCAL-PREF in
route-map AGIS-ASPATH-PREPEND permit 10
    match as-path 10
    set as-path prepend <Filled in by fourth step 191>
route-map AGIS-LOCAL-PREF permit 10
    match as-path <Filled in by third step 190>
    set local-pref <Filled in by first step 188>
route-map AGIS-LOCAL-PREF permit 20
    match as-path 1
    set local-pref <Filled in by first step 188>
Netcom
router bgp 6993
    neighbor 206.215.28.1 remote-as 2551
    neighbor 206.215.28.1 version 4
    neighbor 206.215.28.1 distribute-list 1 out
    neighbor 206.215.28.1 route-map NETCOM-ASPATH-PREPEND out
    neighbor 206.215.28.1 distribute-list 1 in
    neighbor 206.215.28.1 route-map NETCOM-LOCAL-PREF in
route-map NETCOM-ASPATH-PREPEND permit 10
    match as-path 10
    set as-path prepend <Filled in by fourth step 191>
route-map NETCOM-LOCAL-PREF permit 10
    match as-path <Filled in by third step 190>
    set local-pref <Filled in by first step 188>
route-map NETCOM-LOCAL-PREF permit 20
    match as-path 1
    set local-pref <Filled in by first step 188>
PSI
```

-continued

```
router bgp 6993
    neighbor 204.6.107.1 remote-as 174
    neighbor 204.6.107.1 version 4
    neighbor 204.6.107.1 distribute-list 1 out
    neighbor 204.6.107.1 route-map PSI-LOCAL-PREF in
    neighbor 204.6.107.1 distribute-list 1 in
    neighbor 204.6.107.1 route-map PSI-ASPATH-PREPEND out
route-map PSI-ASPATH-PREPEND permit 10
    match as-path 10
    set as-path prepend <Filled in by fourth step 191>
route-map PSI-LOCAL-PREF permit 10
    match as-path <Filled in by third step 190>
    set local-pref <Filled in by first step 188>
route-map PSI-LOCAL-PREF permit 20
    match as-path 1
    set local-pref <Filled in by first step 188>
```

It will be seen that for each P-NAP Provider base configuration there are the following statements:

neighbor . . . remote-as: This defines the remote Autonomous System of the P-NAP Provider to which the P-NAP peers.

neighbor . . . version 4: This statement requires that the neighbor speak BGP version 4.

neighbor . . . distribute-list 1 out: This statement ensures that the P-NAP does not send the Internet default route (0.0.0.0) to a P-NAP Provider.

neighbor . . . distribute-list 1 in: This statement ensures that the P-NAP does not receive the Internet default route (0.0.0.0) from a P-NAP Provider.

neighbor . . . route-map <Provider>-LOCAL-PREF in: This statement refers to the set of statements later beginning with "route-map <Provider>-LOCAL-PREF permit 10". These later statements define the LOCAL_PREF values to apply to routes from this P-NAP Provider.

neighbor . . . route-map <Provider>-ASPATH-PREPEND out: This statement refers to the set of statements later beginning with "route-map <Provider>-ASPATH-PREPEND permit 10". These later statements define the AS additions which will be applied to routes sent to this P-NAP Provider.

route-map <Provider>-LOCAL-PREF permit 10: This piece of the route-map (permit as opposed to permit 20) attaches the appropriate local preference (from the table above) to routes which are found to be directly connected to the current provider. The "set local-pref" value is filled in at the time the base router configuration is created from the LOCAL_PREF(1) column in the table above. The "match as-path" attribute is filled in during the third step 190. This "match" clause takes all of the "deny" AS numbers for this provider and when applied to routes, any route not matching any "deny" statement will get assigned this local preference. As described above, in terms of the present invention, any route not matching any "deny" statement for this provider will be those directly connected routes of the current provider.

route-map <Provider>-LOCAL-PREF permit 20: This piece of the route-map attaches the appropriate local preference (from the table above) to all routes which fail the previous piece of the route map. That is, all routes which were denied in the previous route map or all routes which are not directly connected to the current provider. This is accomplished by any routes failing the previous route map being applied to this route map. The "set local-pref" value is filled in at the time the base router configuration is created from the LOCAL_PREF(2) column in the table above.

route-map <Provider>-ASPATH-PREPEND permit 10: This route-map adds the appropriate number of P-NAP AS numbers to each route sent to a particular provider. The "set as-path prepend" value is filled in by the fourth step 191. The "match as-path 10" statement says to apply this value to all routes matching the AP_PATH described by the number 10. All other routes are implicitly denied. In the case of the P-NAP, "as-path 10" is the list of all P-NAP and P-NAP customer AS numbers. Thus, the route map solves two requirements in one: (1) It only allows routes of the P-NAP or P-NAP customers to be advertised to the Provider; and (2) it attaches the appropriate number of additional ASes to each of those routes.

A third step 190 in the flow chart of FIG. 11 is responsible for creating the "deny" list of AS numbers for each provider, turning that list into the appropriate router configuration commands adding the commands to the base router configuration and filling in the base configurations with the AS list pointer value (noted as <filled in by third step 190> above).

Given that the "deny" list of AS numbers for each provider is made up of the union of all Provider AS numbers and the Exception AS numbers as described above with the current Provider's AS numbers removed, the resulting list for UUNet might be:

```
1239 1785 1790 1791 1792 1793 1794 1795 400 4001 4002 4003 4004
4005 6174 6175 6176 6177 1800 1789 1784 6449 6637 3650 3651 3652
3972 3973 4950 4951 6153 6154 6242 3447 7882 4000 4999 6367 1801
5778 7308 3561 4286 4281 4282 4283 4284 4285 4286 4287 4288 4289
4290 4291 4292 4293 4294 4295 4296 4297 4298 145 3378
1673 1321 1326 1327 1328 1329 1330 1331 1332 1333 1334 1662 1671
1322 1323 1660 1335 1667 1670 1672 1674 1675 1683 1686 1687 1694
1324 1325 1665 1677 174 1280 2554 8013
4200 4993
2551 6996
2685 1 3914 568 6456 5761 4136 6113 286 6172 293 297 2041 4006
1740 3703 2828
```

The resulting "deny" configuration commands for UUNet might be:

```
ip as-path access-list 20 deny __1239__
ip as-path access-list 20 deny __1785__
ip as-path access-list 20 deny __1790__
ip as-path access-list 20 deny __1791__
ip as-path access-list 20 deny __1792__
ip as-path access-list 20 deny __1793__
ip as-path access-list 20 deny __1794__
ip as-path access-list 20 deny __1795__
ip as-path access-list 20 deny __4000__
ip as-path access-list 20 deny __4001__
ip as-path access-list 20 deny __4002__
ip as-path access-list 20 deny __4003__
ip as-path access-list 20 deny __4004__
ip as-path access-list 20 deny __4005__
ip as-path access-list 20 deny __6174__
ip as-path access-list 20 deny __6175__
ip as-path access-list 20 deny __6176__
ip as-path access-list 20 deny __6177__
ip as-path access-list 20 deny __1800__
ip as-path access-list 20 deny __1789__
ip as-path access-list 20 deny __1784__
ip as-path access-list 20 deny __6449__
ip as-path access-list 20 deny __6637__
ip as-path access-list 20 deny __1238__
ip as-path access-list 20 deny __1801__
ip as-path access-list 20 deny __3447__
ip as-path access-list 20 deny __3650__
ip as-path access-list 20 deny __3651__
ip as-path access-list 20 deny __3652__
ip as-path access-list 20 deny __3972__
``` ip as-path access-list 20 deny _3973_
ip as-path access-list 20 deny _4950_
ip as-path access-list 20 deny _4951_
ip as-path access-list 20 deny _4999_
ip as-path access-list 20 deny _5778_
ip as-path access-list 20 deny _6153_
ip as-path access-list 20 deny _6154_
ip as-path access-list 20 deny _6187_
ip as-path access-list 20 deny _6242_
ip as-path access-list 20 deny _6367_
ip as-path access-list 20 deny _7308_
ip as-path access-list 20 deny _7882_
ip as-path access-list 20 deny _1660_
ip as-path access-list 20 deny _1665_
ip as-path access-list 20 deny _1667_
ip as-path access-list 20 deny _1670_
ip as-path access-list 20 deny _1672_
ip as-path access-list 20 deny _1674_
ip as-path access-list 20 deny _1675_
ip as-path access-list 20 deny _1677_
ip as-path access-list 20 deny _1683_
ip as-path access-list 20 deny _1686_
ip as-path access-list 20 deny _1687_
ip as-path access-list 20 deny _1693_
ip as-path access-list 20 deny _1694_
ip as-path access-list 20 deny _1681_
ip as-path access-list 20 deny _1673_
ip as-path access-list 20 deny _1321_
ip as-path access-list 20 deny _1326_
ip as-path access-list 20 deny _1327_
ip as-path access-list 20 deny _1328_
ip as-path access-list 20 deny _1329_
ip as-path access-list 20 deny _1330_
ip as-path access-list 20 deny _1331_
ip as-path access-list 20 deny _1332_
ip as-path access-list 20 deny _1333_
ip as-path access-list 20 deny _1334_
ip as-path access-list 20 deny _1662_
ip as-path access-list 20 deny _1671_
ip as-path access-list 20 deny _1322_
ip as-path access-list 20 deny _1323_
ip as-path access-list 20 deny _1324_
ip as-path access-list 20 deny _1325_
ip as-path access-list 20 deny _1335_
ip as-path access-list 20 deny _4200_
ip as-path access-list 20 deny _4993_
ip as-path access-list 20 deny _2551_
ip as-path access-list 20 deny _6996_
ip as-path access-list 20 deny _3561_
ip as-path access-list 20 deny _4286_
ip as-path access-list 20 deny _4281_
ip as-path access-list 20 deny _4282_
ip as-path access-list 20 deny _4283_
ip as-path access-list 20 deny _4284_
ip as-path access-list 20 deny _4285_
ip as-path access-list 20 deny _4286_
ip as-path access-list 20 deny _4287_
ip as-path access-list 20 deny _4288_
ip as-path access-list 20 deny _4289_
ip as-path access-list 20 deny _4290_
ip as-path access-list 20 deny _4291_
ip as-path access-list 20 deny _4292_
ip as-path access-list 20 deny _4293_
ip as-path access-list 20 deny _4294_
ip as-path access-list 20 deny _4295_
ip as-path access-list 20 deny _4296_
ip as-path access-list 20 deny _4297_
ip as-path access-list 20 deny _4298_
ip as-path access-list 20 deny _145_
ip as-path access-list 20 deny _3378_
ip as-path access-list 20 deny _174_
ip as-path access-list 20 deny _1280_
ip as-path access-list 20 deny _2149_
ip as-path access-list 20 deny _2554_
ip as-path access-list 20 deny _8013_
ip as-path access-list 20 deny _1290_
ip as-path access-list 20 deny _2685_
ip as-path access-list 20 deny _1_
ip as-path access-list 20 deny _3914_
ip as-path access-list 20 deny _568_
ip as-path access-list 20 deny _6456_
ip as-path access-list 20 deny _5761_
ip as-path access-list 20 deny _4136_
ip as-path access-list 20 deny _6113_
ip as-path access-list 20 deny _286_
ip as-path access-list 20 deny _6172_
ip as-path access-list 20 deny _293_
ip as-path access-list 20 deny _297_
ip as-path access-list 20 deny _2041_
ip as-path access-list 20 deny _4006_
ip as-path access-list 20 deny _1740_
ip as-path access-list 20 deny _3703_
ip as-path access-list 20 deny _2828_

The resulting "match as-path" statement in "route-map UUNET-LOCAL-PREF permit 10" would get the value 20 because the list above is numbered "20". Thus the statement would look like "match as-path 20".

A fourth step 191 in the flow chart of FIG. 11 is responsible for taking the number of AS path additions for each provider and filling in the "as-path prepend" statement of the <Provider>-ASPATH-PREPEND route-map. The "as-path prepend" statement expects any number of the current Autonomous System's AS numbers as arguments. Thus, UUNet does not have an ASPATH-PREPEND route map because its number of AS additions is zero. According to the example of AS number additions given above, Sprint will have one addition. Thus the "as-path prepend" statement will look like:
as-path prepend 6993
where 6993 is the AS number of the current P-NAP.

Using the AS path addition values described previously, the remaining Provider as-path prepend statements will look like the following:
MCI: as-path prepend 6993 6993 6993
ANS: as-path prepend 6993 6993 6993 6993
AGIS: as-path prepend 6993 6993 6993 6993 6993
Netcom: as-path prepend 6993 6993 6993 6993 6993 6993
PSI: as-path prepend 6993 6993 6993 6993 6993 6993 6993

A fifth step 192 in the flow chart of FIG. 11 is the step of setting a P-NAP Provider's LOCAL_PREF value. This step 192 occurs at connection turn up time and involves informing the P-NAP Provider, by telephone or E-mail, that arrangements should be made to set their BGP4 LOCAL_PREF for the P-NAP connection to a value which is higher than their LOCAL_PREF for routes received at the NAPs. Once this LOCAL_PREF is set, it is left alone for the duration of time that the provider is attached to the P-NAP.

A sixth step 193 in the flow chart of FIG. 11 is that of applying each provider specific router configuration to the router connecting the provider. What this step 193 entails is applying the router configuration files that were created in the four preceding steps 188, 189, 190, 191 to routers that connect to each P-NAP Provider. In the preferred embodiment disclosed herein, the ASsimilator algorithm 180 which resides in the network management shelves 144, 145 (shown in FIG. 3) creates router configuration files by following the four steps 188, 189, 190, 191 shown in FIG. 11, and the created router configuration files are applied to the core routers 105, 106, 116 (shown in FIGS. 3 and 4) as indicated in the sixth step 193 (FIG. 11).

A seventh step 194 in the flow chart of FIG. 11 is that of causing the router to obtain full routes from the provider. This is done via BGP4 at the time the router configurations are loaded into the core routers 105, 106, 116 and the BGP4 protocol negotiation is completed between the P-NAP and the P-NAP Provider.

An eighth step 195 in the flow chart of FIG. 11 is that of causing the router to apply the P-NAP Provider configuration files to the routes. With Cisco routers, in the preferred embodiment, this is done through the router configuration commands which were created in the preceding steps 188, 189, 190, 191 and 192.

Figure 12A:
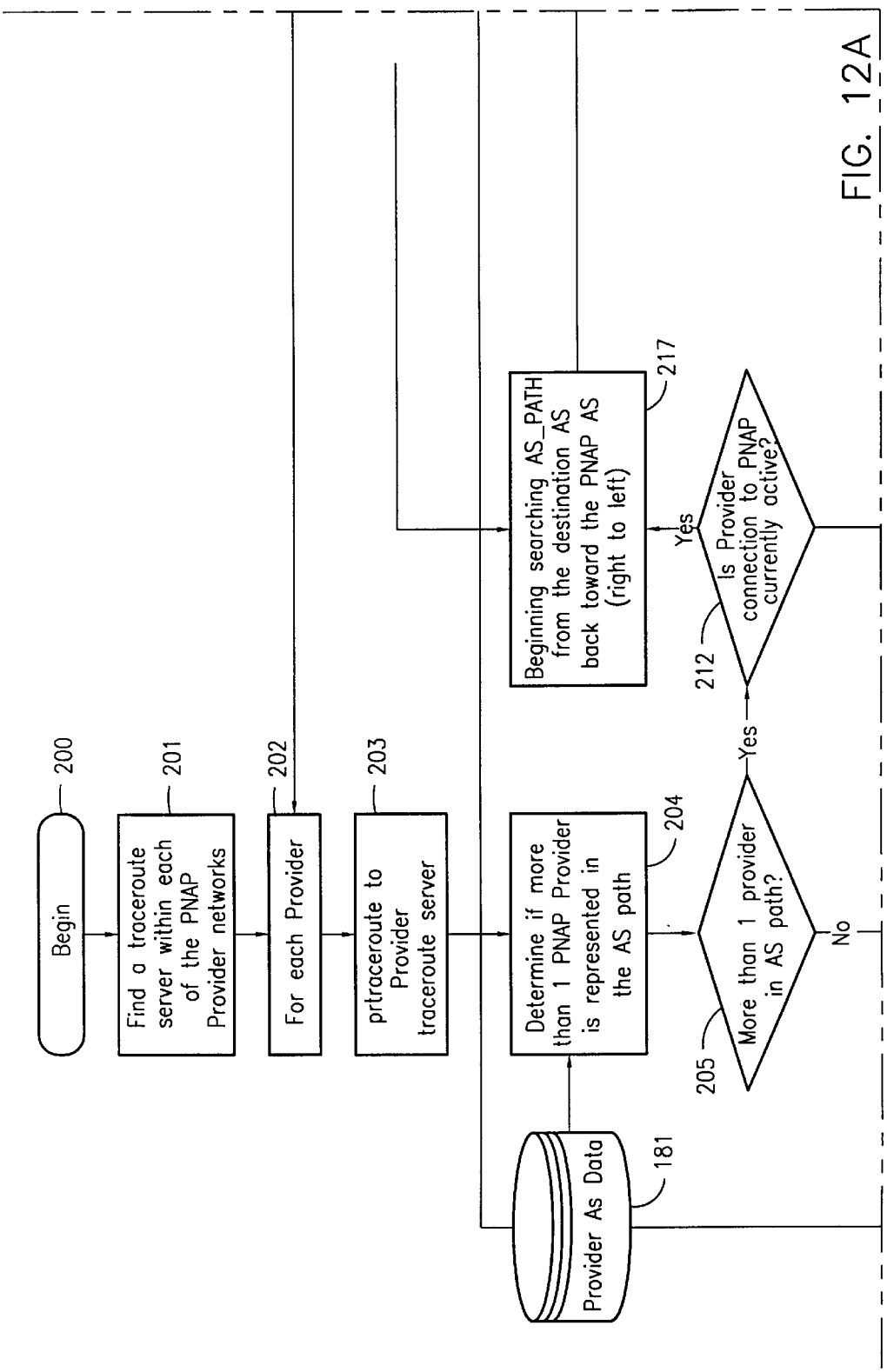
FIG. 12 is a flow chart in accordance with the principles of the present invention indicating steps in a process to accomplish path verification in an Internet system such as that shown in FIG. 10.
Figure 12C:
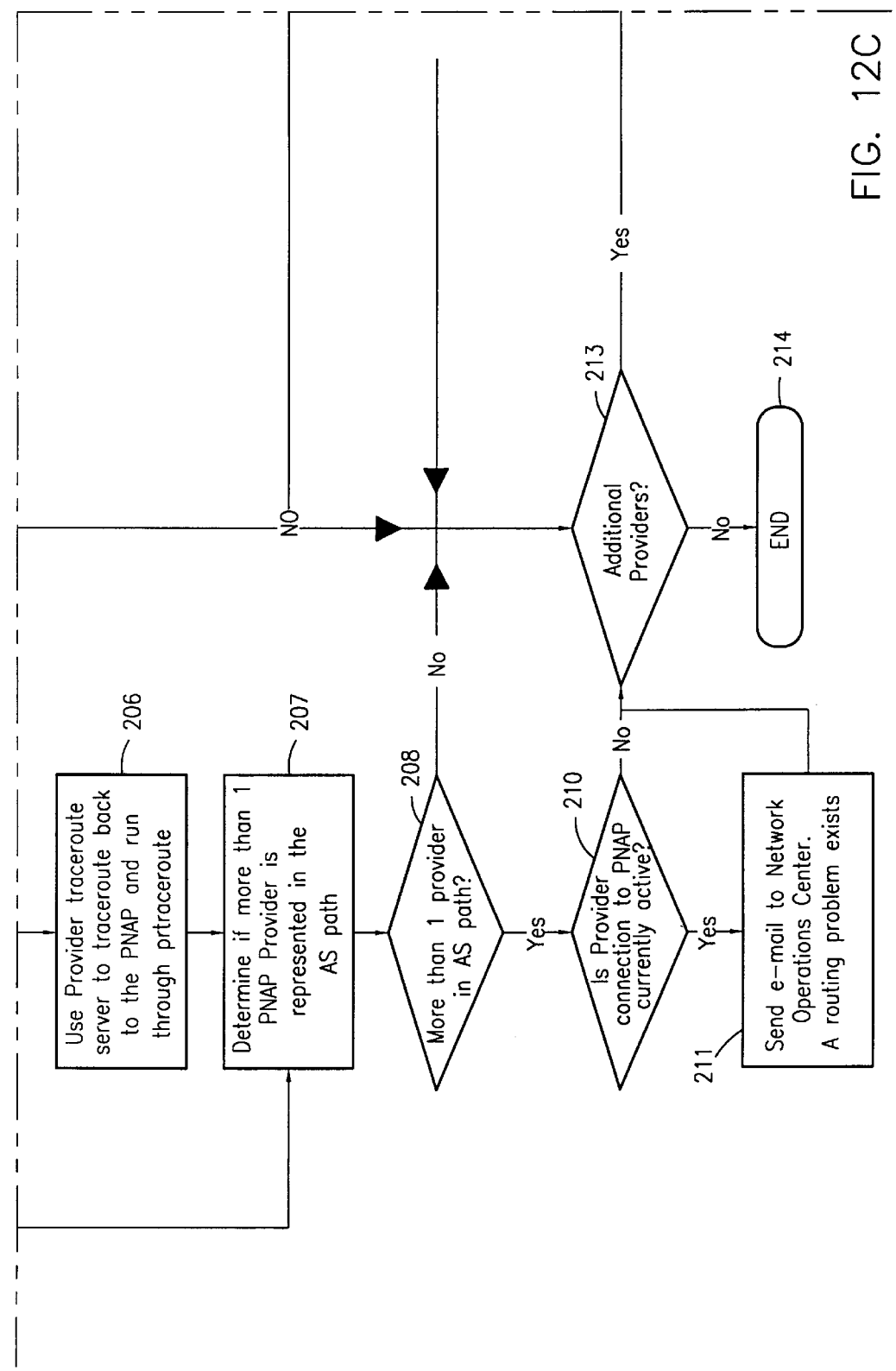
Figure 12D:
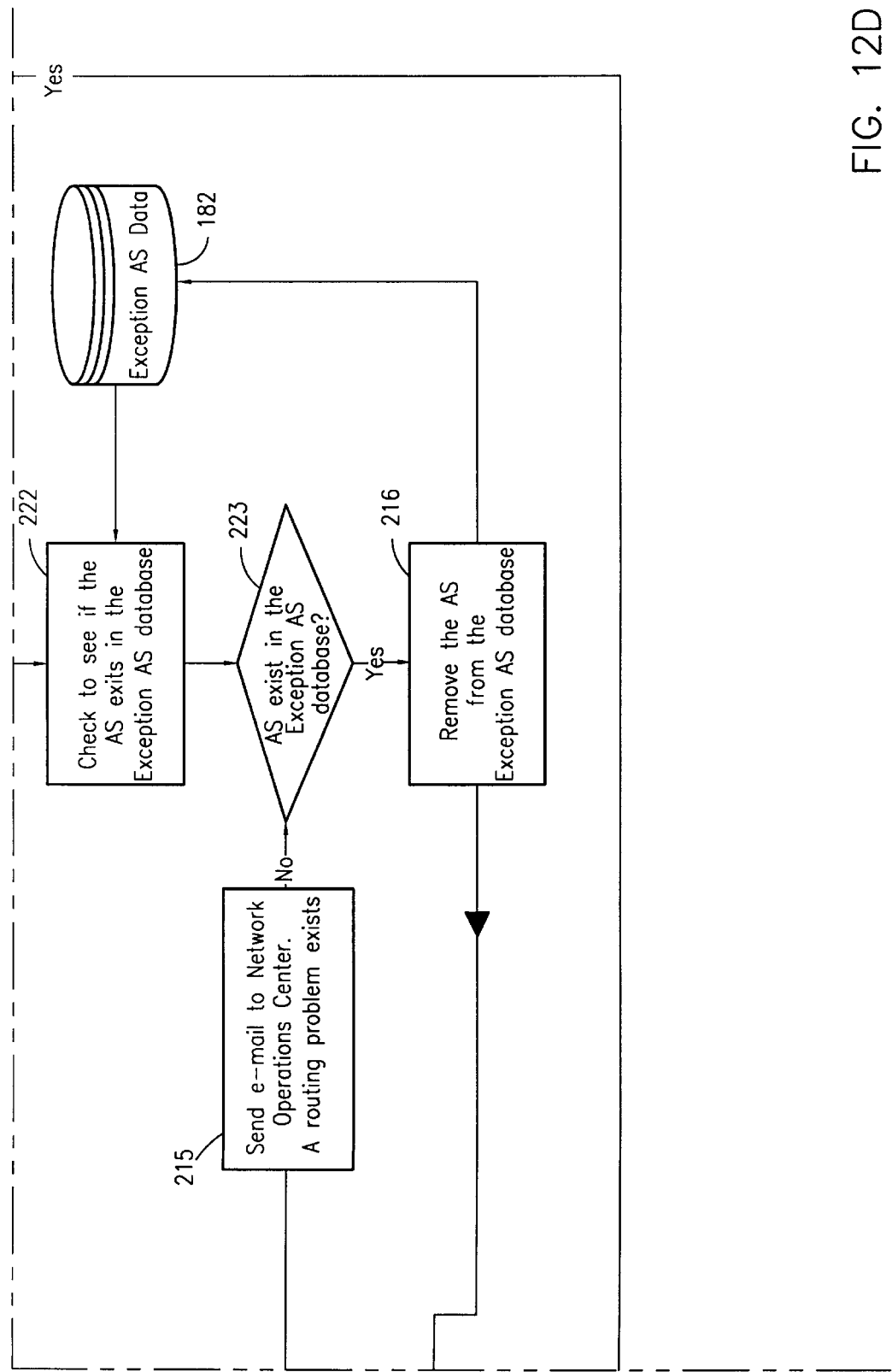

FIG. 12 is a flow chart in accordance with the principles of the present invention indicating the detailed steps involved in the Path Verification process 184 (FIG. 11). Path verification is accomplished by a software application known as "Routebot". Routebot is a software program that is resident in the network management shelves 144, 145. Routebot makes use of the databases known as Provider AS Data 181 and Exception AS Data 182, both shown in FIG. 11.

The path verification process is shown in terms of method steps in the flow chart of FIG. 12. The process starts at the terminal 200 labeled "Begin". A box 201 shows the first step labeled "Find a traceroute server within each of the P-NAP Provider networks." Referring back to FIG. 2, the P-NAP 100 of the preferred embodiment has seven providers, namely Sprint, MCI, UUNet, Netcom, PSI, AGIS and ANS. It is necessary to find, within each of these providers, a server supporting traceroute that allows outside entities to use it to determine paths from it to other destinations within the Internet. Today, a good source for locations of public traceroute servers can be found at http://www.boardwatch.com/ isp/trace.htm. Once an acceptable traceroute server has been located within each P-NAP Provider, that server's address is configured into the Routebot software. The remainder of the steps described in FIG. 12 are the algorithm used by Routebot to update the Exception AS Data database 182.

The next step in the series of steps in FIG. 12 is indicated by a box 202 labeled "For each Provider". Box 202 indicates that the path verification process will occur for each of the Providers shown in FIG. 2 and listed above. Within the remainder of this process, the term "Provider" is used to indicate the current Provider. The next step in the series of steps is indicated by a box 203 which is labeled "prtraceroute to Provider traceroute server". The box 203 thus indicates that the command "prtraceroute" is invoked from the server Network Mgmt-1 144 (FIG. 3) to the current Provider traceroute server. It will be understood that "prtraceroute" is an enhanced version of the "traceroute" application which appends AS numbers to each hop. In the preferred embodiment, such a command used to trace to the current Sprint traceroute server would return the following output:

| 1 | AS6993 | border1a.e3-corplan1.sea.P-NAP | 206.253.194.60 | [I] |
|---|---|---|---|---|
| 2 | AS6993 | core1.fl-0-fddi1.sea.P-NAP.net | 206.253.192.65 | [I] |
| 3 | AS1239 | sl-sea-6-H10/0-T3.sprintlink.n | 144.228.96.13 | [?] |

-continued

| 4 | AS1239 | 144.228.90.9 | 144.228.90.9 | [I] |
|---|---|---|---|---|
| 5 | AS1790 | 144.232.8.53 | 144.232.8.53 | [?] |
| 6 | AS1239 | sl-fw-11-F0/0.sprintlink.net | 144.228.30.11 | [?] |
| 7 | AS1239 | sl-igsi-2-S0-T1.sprintlink.net | 144.228.131.46 | [I] |
| 8 | AS1239 | develop.iglobal.net | 207.43.170.13 | [I] |

The first column is the hop number; the second column is the AS number of the current hop; the third column is the IP address or domain name (if available) of the current hop; the fifth column is the IP address of the current hop; and the sixth column is an administrative flag which is not used for the purposes of this invention. This output defines the path a packet takes from the P-NAP to the traceroute server located within Sprint. The AS path of this output would be "6993 6993 1239 1239 1790 1239 1239 1239".

The next step is indicated by a box 204 labeled "Determine if more than one P-NAP Provider is represented in the AS path". Box 204 thus is seen to make a comparison between the AS path returned by the traceroute and the Provider AS Data database 181. The purpose of this step is to determine if there is more than one P-NAP Provider represented in the AS path. In the example above, 6993 is the P-NAP, 1239 is Sprint and 1790 is Sprint. Thus, when tracing from the P-NAP to a destination on Sprint, this example only traverses Sprint. The step of box 204 goes to a decision block 205. The decision block 205 asks a question "More than 1 P-NAP Provider in AS path?" If no (as with the example above), then the method sequence moves on to box 206.

The step of box 206 is identified as "Use Provider traceroute server to traceroute back to the P-NAP and run through prtraceroute". Referring back to the step of box 203, in that step, the outgoing path from the P-NAP to the Provider traceroute server was determined. In the box 206, the reverse path is being determined and will list the path from the Provider traceroute server back to the P-NAP. Because provider traceroute servers do not, in most cases, run "prtraceroute", the output of the Provider traceroute server must be run through "prtraceroute". An example of the output from the Sprint traceroute server back to the P-NAP after it has been run through prtraceroute might be as follows:

| 1 | AS1239 | backbone.iglobal.net | 207.43.170.1 | [I] |
|---|---|---|---|---|
| 2 | AS1239 | sl-fw-14-S1/5-T1.sprintlink | 144.228.134.25 | [I] |
| 3 | AS1239 | sl-fw-1-F0/0.sprintlink.net | 144.228.30.1 | [?] |
| 4 | AS1790 | | 144.232.8.54 | [?] |
| 5 | AS1239 | sl-sea-6-F0/0.sprintlink.ne | 144.228.90.6 | [I] |
| 6 | AS1239 | sl-internap-1-s0-T3.sprintl | 144.228.96.14 | [?] |
| 7 | AS6993 | border1a.f0-fddi1.sea.P-NAP | 206.253.192.68 | [I] |
| 8 | AS6993 | hercules.internap.com | 206.253.194.98 | [I] |

The AS path of this output would be "1239 1239 1239 1790 1239 1239 6993 6993". The next step is indicated by a box 207 which is labeled "Determine if more than one P-NAP Provider is represented in the AS path". This step of box 207 is the equivalent of the step above in box 204 except it is working on the path from the Provider back to the P-NAP. Following the step of box 207, there is another decision block 208. As in the previous decision block 205, this decision block 208 asks "More than 1 provider in AS path?". If yes, this decision block flows to a second decision block 210. This decision block 210 asks the question "Is Provider connection to P-NAP currently active?". If yes, this method flows to another method step as shown by box 211. If the Provider connection to the P-NAP were down for some reason when the traceroute was active, the results would be incorrect because we would be routing on redundant P-NAP Providers until the Provider connection were activated again. In this case, there is no problem. But, if the Provider connection to the P-NAP is up and we are at this step, then there is a problem which can not be solved automatically by the Routebot. Box 211 is labeled "Send e-mail to Network Operation Center". Thus, if the path from the P-NAP to the Provider is correct, but the path back from the Provider is incorrect and the Provider connection is currently active, send E-mail so that a human can diagnose and attend to the problem.

Returning to the first decision block 205, if the decision is yes, it goes to a decision block 212. Thus, if when running a traceroute from the P-NAP to the Provider, and the AS path goes through more than one P-NAP Provider, we end up at decision block 212. The output of a prtraceroute with more than one provider may look like the following fictionalized output:

| 1 | AS6993 | border1a.e3-corplan1.sea.P-NAP. | 206.253.194.60 | [I] |
| 2 | AS6993 | core2.fl-0-fddi1.sea.P-NAP.net | 206.253.192.66 | [I] |
| 3 | AS701 | 906.Hssi4-0.GW2.SEA1.ALTER.NET | 137.39.136.137 | [?] |
| 4 | AS701 | 422.atml-0.cr2.seal.alter.net | 137.39.13.82 | [I] |
| 5 | AS701 | 110.Hssi1-0.GW2.FFX1.Alter.Net | 137.39.70.65 | [I] |
| 6 | AS1239 | sl-fw-11-F0/0.sprintlink.net | 144.228.30.11 | [?] |
| 7 | AS1239 | sl-igsi-2-S0-T1.sprintlink.net | 144.228.131.46 | [I] |
| 8 | AS3914 | develop.iglobal.net | 207.43.170.13 | [I] |

The AS path for this output is "6993 6993 701 701 701 1239 1239 3914". Because 701 would be found in the Provider AS Data Database 181 as belonging to UUNet and 1239 would be found in the Provider AS Data Database 181 as belonging to Sprint, this AS path crosses more than one P-NAP Provider.

The decision block 212 asks "Is Provider connection to P-NAP currently active?". If the answer is no, then it is potentially acceptable to have this kind of trace. If the Provider circuit is currently unavailable, then the P-NAP must route to the destination on the current "default" provider and the above trace output would be the result. The sequence flows to decision block 213. This decision block 213 asks "Additional Providers?". If the answer is no (all P-NAP Providers have been tested in this run), the sequence stops at a terminal 214 labeled "End". If the answer to decision block 213 is yes, then the method flows back to box 202 where the algorithm is run on the next Provider in the list of Providers. Returning to decision block 208, if it yields a no, then the method sequence flows to decision block 213, asking "Additional Providers?". As above, if the answer is no, the sequence stops at a terminal 214 labeled "End". Returning also to decision block 210, if the answer is no, then it flows to the decision block 213.

If the answer to decision block 212 is yes, then the sequence flows to a box 217 labeled "Begin searching AS path from the destination AS back toward the P-NAP AS (right to left)". This is the beginning of an inner loop which will operate on each of the AS numbers in the AS path from right to left. The listing presented above is shown as lines 1 to 8, top to bottom. However, the AS path numbers should be visualized in order from left to right. Thus, using the AS path above (6993 6993 701 701 701 1239 1239 3914), this loop will begin with the rightmost AS number (3914) and work its way back to the leftmost AS number (6993). For each AS number from that step, the method step sequence flows to a box 218 labeled "Determine if the current AS is from a P-NAP Provider". Thus, look up the current AS number in the Provider AS Data database 181 to see if a match is found with one of the P-NAP Provider AS numbers. From this step, the method sequence flows to a decision block 220 labeled "Does the AS belong to a P-NAP Provider?". If the answer is no, the sequence flows to a decision block 224 labeled "Additional AS numbers in the path?". If the answer to decision block 224 is yes, then go back to the step of box 217 and run the previous step on the next AS number. If the answer to decision block 224 is no, then the method moves to another decision block 225 labeled "Additional Providers?". If the answer to decision block 225 is no, the sequence stops at a terminal 226 labeled "End". If the answer to decision block 225 is yes, the sequence moves back to box 202 where the algorithm is run for the next provider.

If the answer to decision block 220 is yes, then the sequence flows to a box 221 labeled "Back-up to the non-Provider AS you just previously checked." Using the above example, the "yes" answer to decision block 220 would occur after the program processed "3914" in the path and had moved on to "1239". Looking up 1239 in the Provider AS Data database 181, it would be found that it was mapped to Sprint. Thus, box 221 tells the process to back-up to the previous AS number, 3914 in the example case. From box 221, the method flows to box 222 labeled "Check to see if the AS exists in the Exception AS database". Thus, a search of the Exception AS Data database 182 needs to be made to see if the AS (3914 in this case) exists in that database. The method then flows to a decision block 223 labeled "AS exist in the Exception AS database?". Here, if the answer is yes, then the AS number 3914 was incorrectly added to the Exception AS Data database 181 by the Assimilator algorithm 180. The reason for this is that if an AS number exists in the Exception AS Data database 181, then it is assumed that the AS number is not directly attached to any P-NAP Provider. In the case where routing occurs as in the above example, it is obvious that the traffic should have gone directly to Sprint, but instead used the current "default" provider UUNet. Thus, if AS3914 were removed from the Exception AS database 182, because its routes will be tagged with a 1239 (because they have a Sprint connection), the routing will see AS3914 as being directly connected to Sprint and route via Sprint. If the answer to decision block 223 is yes, then the method advances to box 216 where the incorrect AS number is removed from the Exception AS Data database 182. The method then flows to decision block 213 described previously.

If the answer to decision block 223 is no, then the method flows to a box 215 labeled "Send e-mail to Network Operations Center. A routing problem exists". Thus, there is a problem which must be solved by human intervention. The method flows from box 215 to decision block 213 described previously.

Figure 13A:
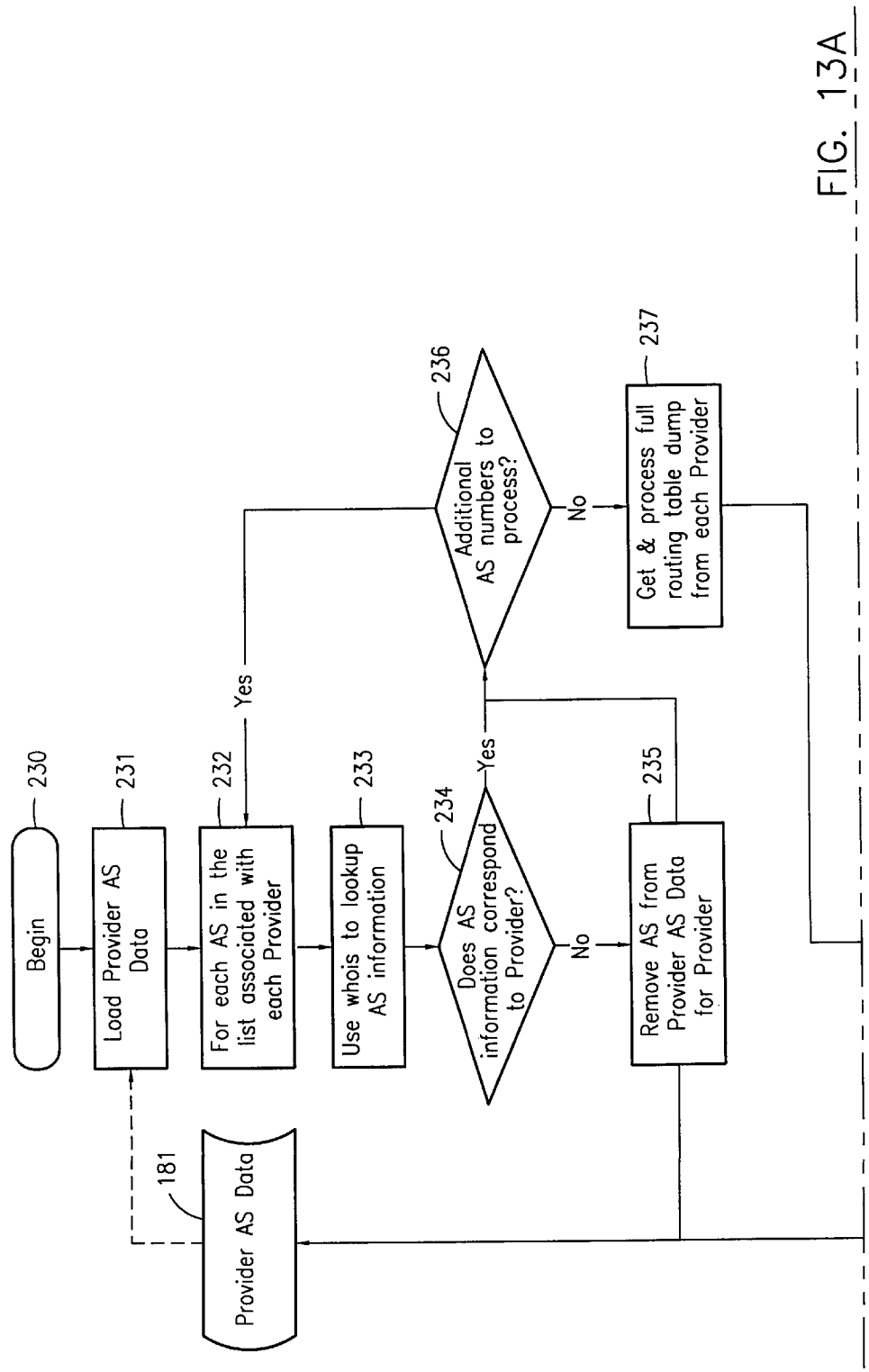
FIGS. 13 and 14 taken together comprise a flow chart indicating method steps in the operation of the P-NAP ASsimilator process of the present invention.
Figure 13B:
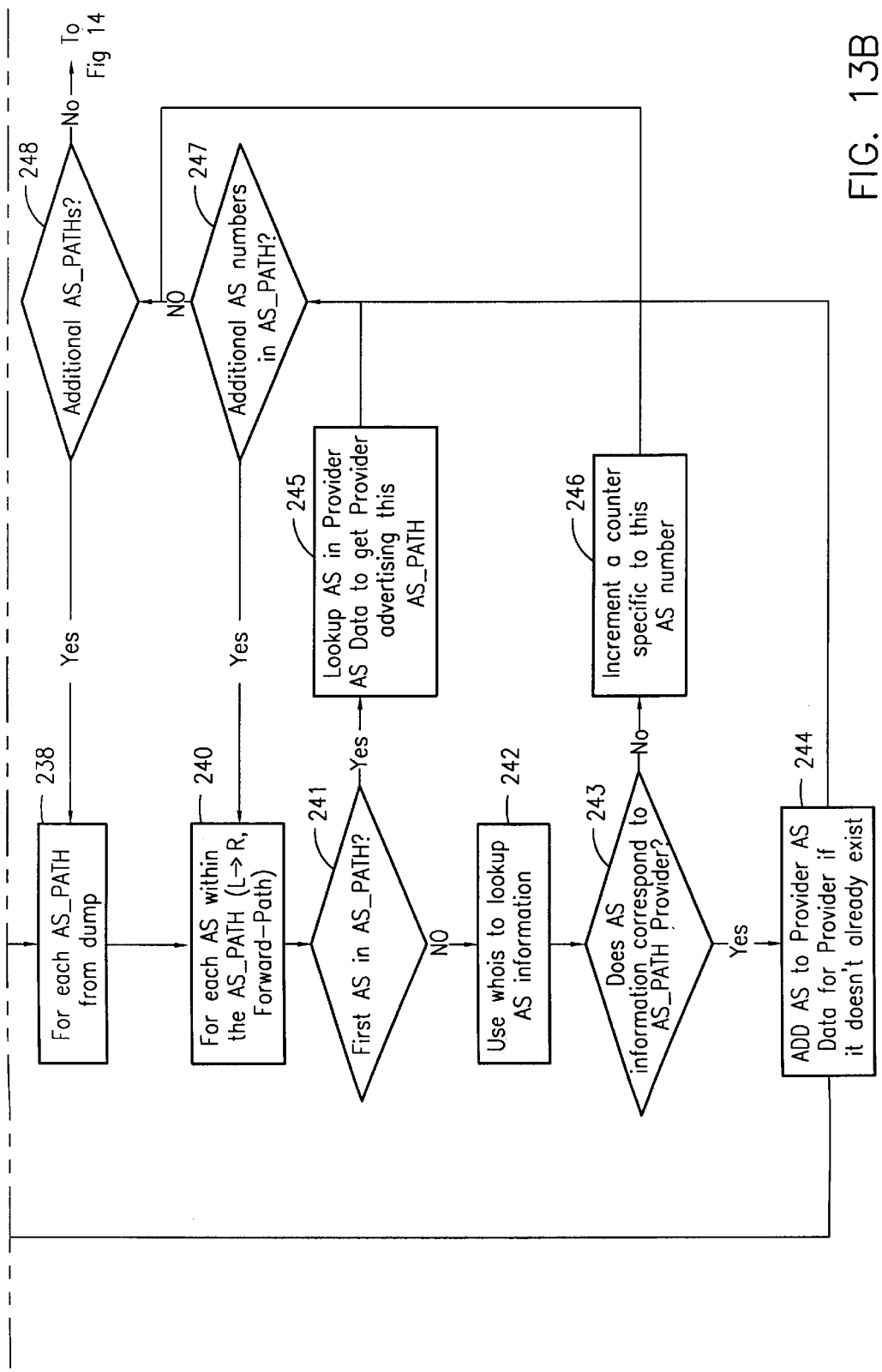
Figure 14:
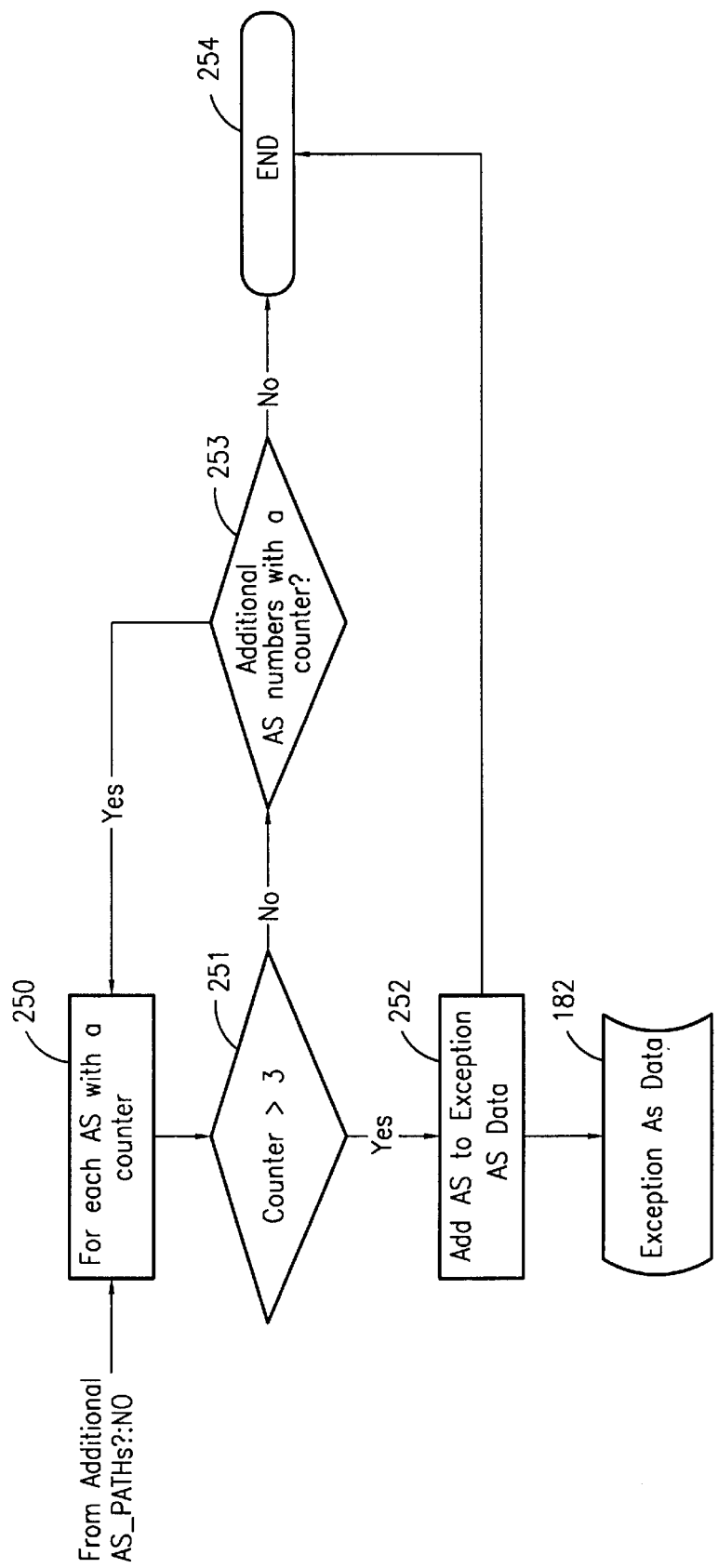

FIGS. 13 and 14 taken together comprise a flow chart indicating the detailed steps of the ASsimilator algorithm 180 (FIG. 11). Referring now to FIG. 13, the sequence of steps starts at a terminal 230 labeled "Begin". A first box 231 labeled "Load Provider AS Data" indicates the first step in the method. This step takes all of the Provider/AS mappings from the Provider AS Data database 181 and loads them into memory. The next step is indicated by a box 232 labeled "For each AS in the list associated with each Provider". This step marks the beginning of a double loop, the first of which traverses each provider in the Provider AS Data database 181 and the second which traverses all of the AS numbers currently associated with each provider. The next step is indicated by a box 233 labeled "Use whois to lookup AS information". For the current AS number within the current Provider, an Internet directory lookup service, "whois", is used to get information. As defined in Request For Comment (RFC) 954, the "whois" service allows a client on one machine to obtain information on a remote system. When doing a "whois" for AS information, the remote system name is rs.internic.net, a server managed by an entity known as the InterNIC, the Internet Network Information Center. Following the step of box 233, the method flows to a decision block 234 labeled "Does AS information correspond to Provider?". A "whois" query will return information such as the following:

```
Sprint (ASN-ICM-INRIA)
    Government Systems Division
    13221 Woodland Park Road
    Herndon, VA 22071
    Autonomous System Name: SprintLink
    Autonomous System Number: 1239
    Coordinator:
        Goel, Vab (VAB-US) vgoe1@SPRINT.NET
        703-689-6249
    Alternate Contact:
        Sprint Network Info. & Support Center
        (SPRINT-NOC) noc@sprintlink.net
        (800) 669-8303
    Record last updated on 20-Mar-97.
    Database last updated on 7-Aug-97 04:30:06 EDT.
```

A record similar to this for the current AS number is then scanned for the name of the current Provider. If the current Provider name cannot be found within the record, therefore the answer to decision block 234 is no, the method flows to a box 235 labeled "Remove AS from Provider AS Data for Provider". For whatever reason, the AS number was previously registered to the current Provider, but it is no longer so registered, so the AS number needs to be removed from the Provider AS Data database 181. The method then flows to another decision block 236 labeled "Additional AS numbers to process". If the answer to decision block 234 is yes, the method also flows to decision block 236. At decision block 236, if there are additional AS numbers for the current Provider and additional Providers to verify, the answer to the block being yes, then the method flows back to box 232. If the answer to decision block 236 is no, then the process has just finished the task of verifying that all of the current Provider/AS mappings are still valid. This algorithm works in such a way that the Provider AS Data database 181 only needs to be primed with the directly connected AS number of each Provider the first time it is run. Then each time the algorithm is run, the data is first verified, any incorrect data is removed and then new data is added.

Once the answer to decision block 236 is no, then the method flows to a box 237 labeled "Get & process full routing table dump from each Provider". This step in the process goes to each of the core routers 105, 106, and 116 (FIG. 3) and downloads all of the AS_PATH attributes attached to each route within each router. The list of AS paths is then sorted by P-NAP Provider and all duplicates removed. The resulting list looks like the following partial list:

```
1239 1 3749
1239 1 3790
1239 1 3801
1239 1 3909 3909
1239 1 4151
1239 1 4355
```

-continued

```
1239 1 4454
1239 1 4550
1239 1 4766 3559
1239 1 4766 3559 4060
1239 1 4766 4660
1239 1 49
1239 1 4926
1239 1 4926 4270 5692
1239 1 5000 5000 5560 5560 5560 5560 5560 5560 5560
1239 1 5388
1239 1 5494
1239 1 5623
1239 1 5623 6905
1239 1 5684
1239 1 5691
1239 1 5691 35
1239 1 5723
1239 1 5727 2713 2915
1239 1 5727 4631
1239 1 5727 4742 4742
1239 1 6
1239 1 6059
1239 1 6203
    .
    .
    .
```

At the current time, there are 9,209 of these paths which will be processed each time this algorithm is run. This number may change on an hourly basis.

From the step of box 237, the process flows to a box 238 labeled "For each AS_PATH from dump". Box 237 indicates a loop which will run on each of the AS paths from the routing table dump described above. From the step of box 238, the method flows to box 240 labeled "For each AS within the AS_PATH(L->R, Forward-Path). Box 240 indicates that within each AS path, a loop will run on each of the AS numbers within each path, moving from left to right in the path. Thus, if a path is "1239 1 6203", the first AS number processed is "1239" and the last AS number processed is "6203". Note that this is exactly opposite of the way the Path Verification process 184 (FIG. 11) works. Path Verification process 184 works from right to left in the AS path. From the step of box 240, the sequence flows to a decision block 241 labeled "First AS in the AS_PATH?". If this is the first AS number that has been processed within the current AS path, then the answer to this decision block 241 will be yes. If yes, the sequence flows to a box 245 labeled "Lookup AS in Provider AS Data to get Provider advertising this AS_PATH". The first AS in any AS path will be the directly connected AS number of one of the P-NAP Providers. Thus, by looking up the first AS number of an AS path in the Provider AS Data database 181, we know the Provider which advertised the route with this AS path. The sequence then flows to a decision block 247 labeled "Additional AS number in AS-PATH?". Thus, when moving from left to right across AS numbers in the current path, if there are additional AS numbers to process, the answer to this decision block would be yes and the sequence moves back to box 240. If there are no additional AS numbers within the current AS path, then the answer to decision block 247 is no and the sequence moves to a decision block 248 labeled "Additional AS_PATHs?". If there are additional AS paths to process from the routing dump, then the answer to decision block 248 is yes and the sequence moves back to box 238.

If the answer to decision block 241 is no, the sequence flows to a box 242 labeled "Use whois to lookup AS information". In the same manner that already existing Provider AS Data database 181 information was verified above, each AS beyond the first in any AS path is looked up using "whois" and the current provider name (which is found when the first AS in the Provider AS Data database 181 is looked up) is searched for within the returned record. From this step, the sequence flows to a decision block 243 labeled "Does AS information correspond to AS_PATH Provider?". If the Provider name is matched within the resulting "whois" lookup record, then the answer to this decision block 243 is yes and the sequence goes to a box 244 labeled "Add AS to Provider AS Data for Provider if it doesn't already exist". Thus, if the current Provider is found within the "whois" record of the current AS number within the current path, then the current AS number is added to the Provider AS Data database 181 as being part of the current Provider. The sequence then moves to decision block 247 as described above. If, back to decision block 243, the current AS number does not correspond to a Provider and the answer to the decision block 243 is no, then the sequence moves to a box 246 labeled "Increment a counter specific to this AS number". The sequence then moves to decision block 248 as described above. Thus, if the current AS number is not found to belong to a Provider, then processing on this AS path can stop. The process of the present invention is only concerned with AS numbers that belong to P-NAP Providers. A counter is kept for this AS number/ Provider pair to implement the heuristic mechanism within ASsimilator where any AS which is next to more than three P-NAP Providers is considered to peer at the NAPs with the Providers and thus belongs in the Exception AS Data database 182.

Returning back to decision block 248, if the system has processed all AS paths from the routing dump, then the sequence moves to FIG. 14 and to box 250 labeled "For each AS with a counter" where it is determined which non-Provider AS numbers that were encountered should be added to the Exception AS Data database 182. From box 250, the sequence moves to a decision block 251 labeled "Counter >3". Thus, if for the current encountered AS number, if it is found to connect to more than three Providers, thus the answer to decision block 251 is yes, the sequence moves to a box 252 labeled "Add AS to Exception AS Data". The current AS, if it is connected to more than three P-NAP Providers, should be added to the Exception AS Data Database 182. The sequence then stops at the terminal 254 labeled "End". If the answer to decision block 251 is no, the sequence moves to another decision block 253 labeled "Additional AS numbers with a counter?". If additional AS numbers were encountered, and thus the answer to decision block 253 is yes, the sequence moves back to box 250. If no additional AS numbers were encountered directly after a Provider AS number and thus the answer to decision block 253 is no, the sequence stops at the terminal 254 labeled "End".

Figure 15A:
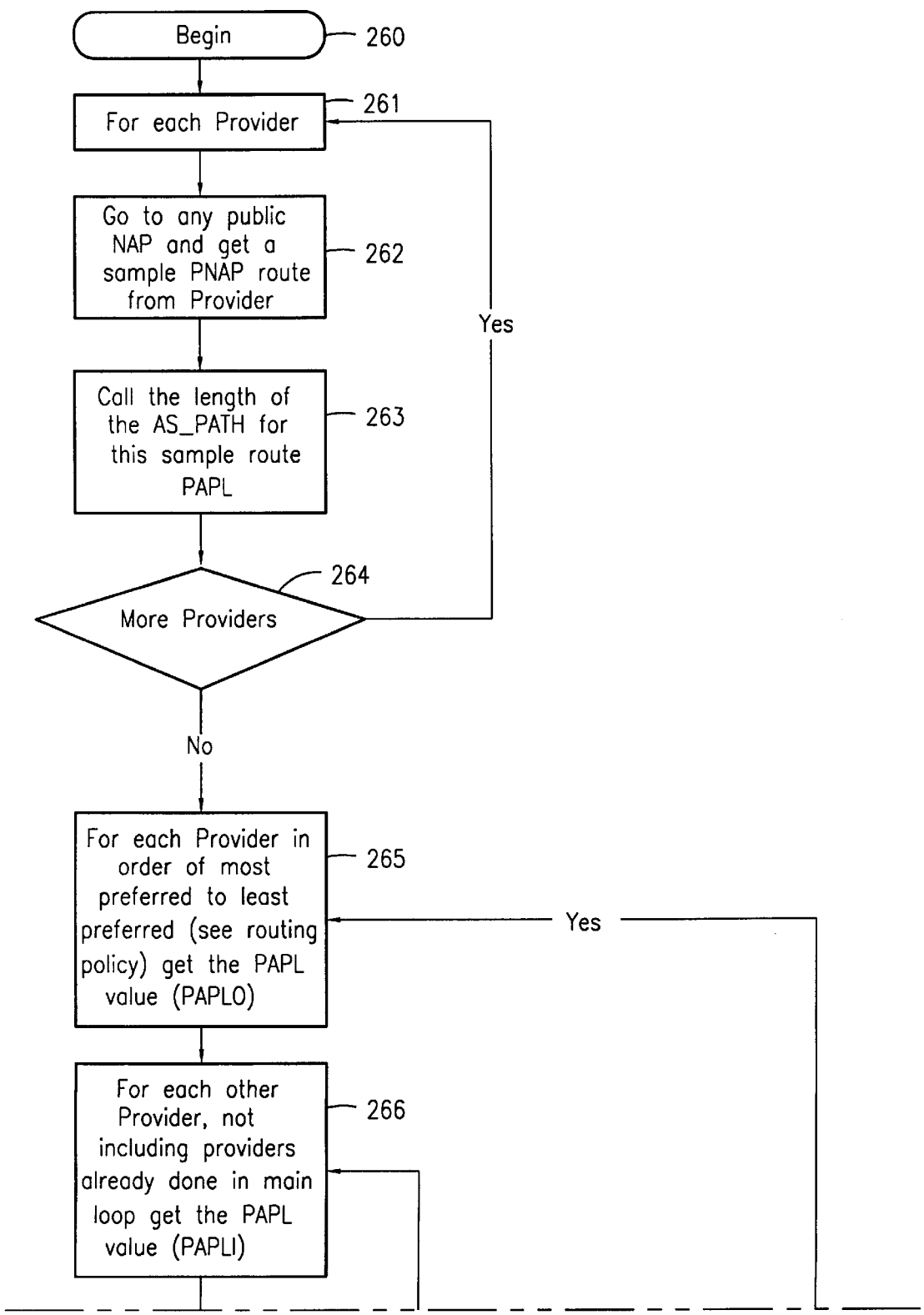
FIG. 15 is a flow chart in accordance with the principles of the present invention indicating a process for determining appropriate AS_PATH lengths for each P-NAP Provider.
Figure 15B:
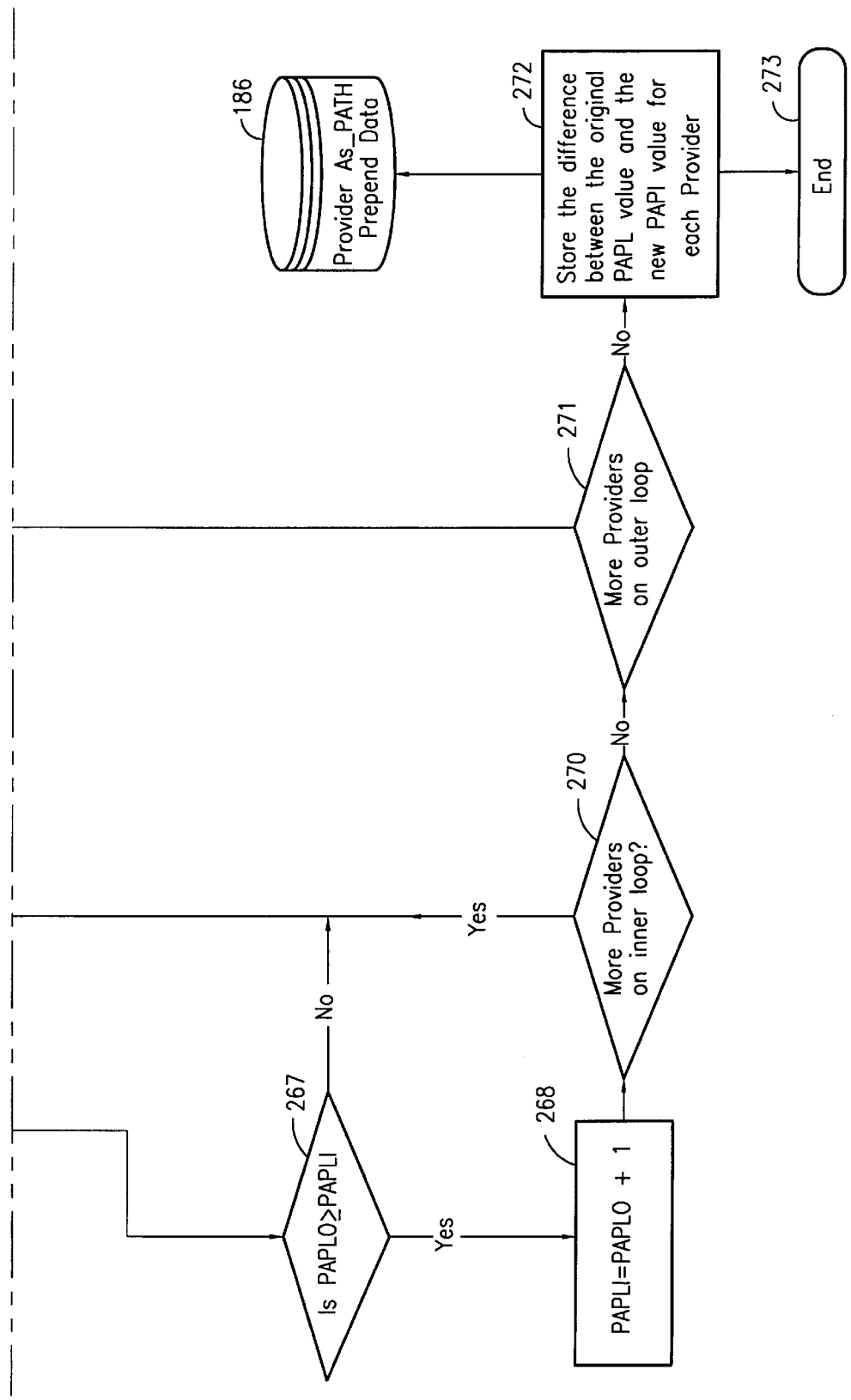

FIG. 15 is a flow chart indicating the steps for the process of determining the number of P-NAP AS numbers to add to routes advertised to each Provider. This flow chart is the detail surrounding the AS_PATH Length Algorithm 185 of FIG. 11. This process starts at a terminal 260 labeled "Begin". The first step is a box 261 labeled "For each Provider". This signals the beginning of a loop which will work on each of the P-NAP Providers, known individually as Provider. The sequence then flows to a box 262 labeled "Go to any public NAP and get a sample P-NAP route from Provider". There exist public servers located at the NAPs which allow looking at any Internet route from the perspective of a server peering with different providers at the NAP. Thus the concept is to look at a route advertised by the P-NAP to a Provider and then from the Provider to this public server. In the P-NAP of the present invention there exists a TCP/IP route, 206.253.192.0/19, advertised to each of the P-NAP Providers and then re-advertised to the NAPs. From the perspective of the NAPs, this route and its associated AS paths (one for each provider) look like the following:

---

BGP routing table entry for 206.253.1920/19, version 1013580
   701 6993
   4200 6993 6993 6993 6993 6993 6993 6993
   1239 6993 6993
   2551 6993 6993 6993 6993 6993 6993 6993 6993
   3561 6993 6993 6993 6993
   1673 1331 6993 6993 6993 6993 6993
   174 6993 6993 6993 6993 6993 6993 6993 6993 6993

---

The above entry is what the route looks like after this current algorithm is run and the appropriate number of AS path additions have been found. Routing table entries such as the above can be found by going to a publically available Internet route-server such as that found at http:// nitrous.digex.net. After determining where in the route-server's network you want to query for a routing entry (typically at one of the public NAPS), you simply type in the route you want to verify and wait for a response. Assume the following fictional list of AS paths for route 206.253.192.0/ 19 before an AS path additions:

---

701 6993
   1239 1661 6993
   3561 3993
   1673 1331 1211 1213 1214 1215 1216 1217 1218 6993
   4200 6993
   2551 6993
   174 6993

---

In the above example, the path corresponding to 701 is UUNet; 1239 is Sprint; 3561 is MCI; 1673 is ANS; 4200 is AGIS; 2551 is Netcom; and 174 is PSI. The step covered by box 262 takes one of the above AS paths depending upon which Provider is currently being analyzed.

The sequence then moves to box 263 labeled "Call the length of the AS_PATH for this sample route PAPL". Thus, using programming arrays, there is a PAPL value for each provider which is the length of the AS path for that provider from the sample route. The sequence then moves to the decision block 264 labeled "More Providers". If there are additional Providers to process then the sequence moves back to box 261. If there are no more Providers, then using the above example, the PAPL values for each Provider are as follows:
PAPL[UtNet]: 2
PAPL[Sprint]: 3
PAPL[MCI]: 2
PAPL[ANS]: 10
PAPL[AGIS]: 2
PAPL[Netcom]: 2
PAPL[PSI]: 2

When the answer to decision block 264 is no, and the PAPL values for each Provider are filled in as above, the sequence moves to box 265 labeled "For each Provider in order of most preferred to least preferred (see routing policy) get the PAPL value (PAPLO)". This is the point in the process when we begin the first of two loops, this loop going through each of the P-NAP Providers from most preferred to least preferred as defined by the routing policy in the first step 188 of FIG. 11. Referring back to the Provider order previously shown to exist for the P-NAP of the present invention:

1. UUNet
2. Sprint
3. MCI
4. ANS
5. AGIS
6. Netcom
7. PSI

The first provider to be processed starting at box 265 is UUNet; the second is Sprint; and so on through to PSI. The PAPL value for the current Provider is moved into a temporary variable called PAPLO. The sequence then moves to a box 266 labeled "For each other Provider, not including providers already done in main loop get the PAPL value (PAPLI)". Thus, this inner loop goes through all other Providers except the current Provider and skips those that have already been through the first loop. Therefore, the first time through the outer loop, UUNet is the outer loop Provider and Sprint, MCI, ANS, AGIS, Netcom and PSI are the inner loop providers. The second time through the outer loop, Sprint is the outer loop Provider and MCI, ANS, AGIS, Netcom and PSI are the inner loop providers. Notice that UUNet is not an inner loop provider because at this time, it has already been through the outer loop and thus is not to be used within the inner loop. This continues until the outer loop has gone through all P-NAP Providers. Within box 266, each time through the inner loop, the current inner loop Provider PAPL number is moved into a temporary variable PAPLI.

The sequence then moves to a decision block 267 labeled "Is PAPLO≧PAPLI?". Thus, is the PAPL value for the current outer loop Provider greater than the PAPL value for the current inner loop Provider. If the answer to decision block 267 is no, then the sequence moves back to box 266 to process the next inner loop provider. If the outer loop provider PAPL value is less than the inner loop provider PAPL value then nothing needs to be done, because the outer loop is controlling the primary order, keeping in mind that the smaller the AS path, the more preferred. Thus, if the outer loop provider currently has a value of 2 and it is more preferred than an inner loop provider with a value of 4, nothing needs to be done, because the outer loop provider is supposed to have a smaller AS path length.

If the answer to decision block 267 is yes, then the sequence moves to box 268. At this point, the outer loop provider is supposed to be more preferred, but the current inner loop provider has a smaller AS path length and is thus currently preferred. This has to be fixed so that the AS path length of the less preferred inner provider gets larger. The way this is done is with the formula on the label of box 268, "PAPLI=PAPLO+1". Thus if the outer loop provider has a PAPLO value of 4 and the inner loop provider has a PAPLI value of 2, the new value of the PAPLI for the inner loop provider would be 4+1=5. The value 5 is now larger than the outer loop provider value of 4, so the outer loop provider is more preferred, as is supposed to be the case. This PAPLI value is then stored as the current provider PAPL value so the next time the same inner loop provider is compared with another outer loop provider, its value will be 5 rather than the current 2. Once the new PAPLI value is created in box 268, the process moves to a decision block 270 labeled "More providers on inner loop?". If there are additional providers on the inner loop for the current outer loop, thus the answer to decision block 270 is yes, then the process moves back to box 266 to continue through the next provider on the inner loop. If the answer to decision block 270 is no, the sequence moves to another decision block 271 labeled "More providers on outer loop?". If there are additional providers on the outer loop, thus the answer to decision block 271 is yes, the process moves back to box 265. If the answer to decision block 271 is no, the sequence moves to box 272.

Showing this process visually, using the example PAPL values above, each time through the outer loop the PAPL values of each provider would be as follows:

| OLoop | UUNet | Sprint | MCI | ANS | AGIS | Netcom | PSI |
|---|---|---|---|---|---|---|---|
| UUNet | 2 | 3 | 3 | 10 | 3 | 3 | 3 |
| Sprint | | 3 | 4 | 10 | 4 | 4 | 4 |
| MCI | | | 4 | 10 | 5 | 5 | 5 |
| ANS | | | | 10 | 11 | 11 | 11 |
| AGIS | | | | | 11 | 12 | 12 |
| Netcom | | | | | | 12 | 13 |
| PSI | | | | | | | 13 |

Once at box 272, labeled "Store difference between original PAPL and new PAPL for each Provider", the value of the original PAPL at the beginning of the process is subtracted from the value of the current PAPL after the completion of the two loops. The resulting value is stored in the Provider AS_PATH Prepend Data database 186. Thus, using the example above, the values to be stored in the Provider AS_PATH Prepend Data database 186 are:

UUNet
2−2=0
Sprint
3−3=0
MCI
4−2=2
ANS
10−10=0
AGIS
11−2=9
Netcom
12−2=10
PSI
13−2=11

The process is then stopped at a terminal 273 labeled "End".

Figure 16:
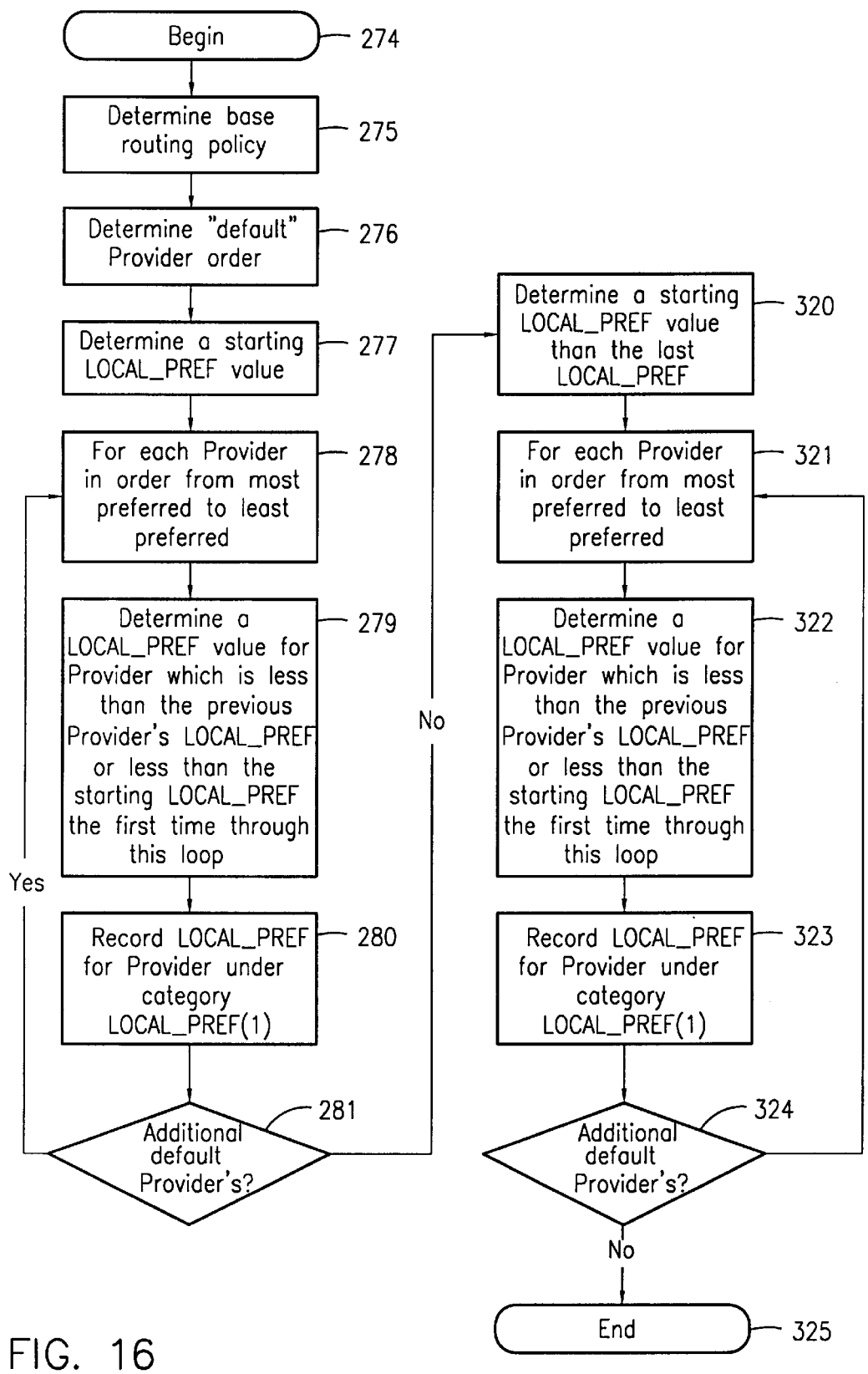
FIG. 16 is a flow chart in accordance with the principles of the present invention indicating a process for determining the LOCAL_PREF values used within the P-NAP for each P-NAP Provider.

FIG. 16 is a flow chart in accordance with the principles of the present invention indicating the detailed steps involved in determining the routing policy of the first step 188 (FIG. 11). The process starts at the terminal 274 labeled "Begin". A box 275 show the first step labeled "Determine base routing policy". This is the step of determining which base set of accepted Internet/BGP4 routing practices are going to be used. As discussed previously, the items to be considered are: 1) The version of BGP to use (version 4 is the only currently accepted version); 2) Whether to allow the sending and receiving of the Internet default route (0.0.0.0); and 3) Whether to put filtering in place to make sure one Provider's routes are not advertised to another. The sequence then flows to a box 276 labeled "Determine "default" Provider order". This is the step of determining of all P-NAP Providers, which is primary, secondary, tertiary, etc. The sequence then flows to a box 277 labeled "Determine a starting LOCAL_PREF value". This can be any valid BGP4 LOCAL PREF value. The BGP4 default of 100 will work. This is simply the value that will be attached to the most preferred of all Providers. The sequence then flows to a box 278 labeled "For each Provider in order from most preferred to least preferred". This step indicates the beginning of a loop which will process for each of the P-NAP Providers in the order determined by box 276. The sequence then flows to a box 279 labeled "Determine a LOCAL_PREF value for Provider which is less than the previous Provider's LOCAL_PREF or less than the starting LOCAL_PREF the first time through this loop". Thus, if this is the first time through this loop, a LOCAL_PREF value should be chosen which is less than the starting LOCAL_PREF from box 277. If this is not the first time through this loop, a LOCAL_PREF value should be chosen which is less than the LOCAL_PREF value assigned to the previous Provider. The sequence then flows to a box 280 which is labeled "Record LOCAL_PREF for Provider under category LOCAL_PREF(1)". As previously discussed, there are two sets of LOCAL_PREF values. The first, LOCAL_PREF(1) is assigned to those routes which are found to be directly connected to each provider. Within this loop, all assigned LOCAL_PREF values will be attached to the current Provider under this category. The sequence then flows to a decision block 281 labeled "Additional default Providers". If there are additional Providers to process within this loop, thus the answer to the decision block 281 is yes, then the sequence goes back to box 278.

If the answer to decision block 281 is no, then the sequence moves to box 320 labeled "Determine a starting LOCAL_PREF value less than the last LOCAL_PREF". This is the point at which the second set of LOCAL_PREF values begin to be assigned, which must begin at a point lower than the lowest of the first set, because these values are assigned to routes not directly connected to each provider, and are thus only used in the "default" cases. The value of this starting LOCAL_PREF must be lower than the last LOCAL_PREF assigned in the previous loop. The sequence then flows to a box 321 labeled "For each Provider in order from most preferred to least preferred". As previously, this signals the beginning of a second loop where the processing of each P-NAP Provider occurs in order from most preferred to least preferred. The sequence then flows to a box 322 labeled "Determine a LOCAL PREF value for Provider which is less than the previous Provider's LOCAL_PREF or less than the starting LOCAL_PREF the first time through this loop". This step is handled in exactly the same way as box 279 described above, except the starting point the first time through the loop is from box 320. The sequence then flows to a box 323 labeled "Record LOCAL_PREF for Provider under category LOCAL_PREF(2)". This is the second set of LOCAL_PREF values (LOCAL_PREF(2))which are assigned to all non-directly connected routes from each provider. Within this loop, all assigned LOCAL_PREF values are attached to the current Provider under this category. The sequence then flows to a decision block 324 labeled "Additional default Providers". If there are additional Providers to process within this loop, thus the answer to the decision block 324 is yes, then the sequence goes back to box 321. If the answer to decision block 324 is no, then the process ends at terminal 325.

The result of this process is a table discussed previously:

| Order | Provider | LOCAL PREF | LOCAL PREF |
|---|---|---|---|
| 1 | UUNet | 100 | 75 |
| 2 | Sprint | 99 | 50 |
| 3 | MCI | 98 | 25 |
| 4 | ANS | 95 | 20 |
| 5 | AGIS | 90 | 15 |
| 6 | Netcom | 85 | 10 |
| 7 | PSI | 80 | 5 |

The third column lists the LOCAL_PREF attribute assigned to those routes which are found to be directly connected to each provider.

The fourth column lists the LOCAL_PREF attribute assigned to all other routes from each provider.

Figure 17A:
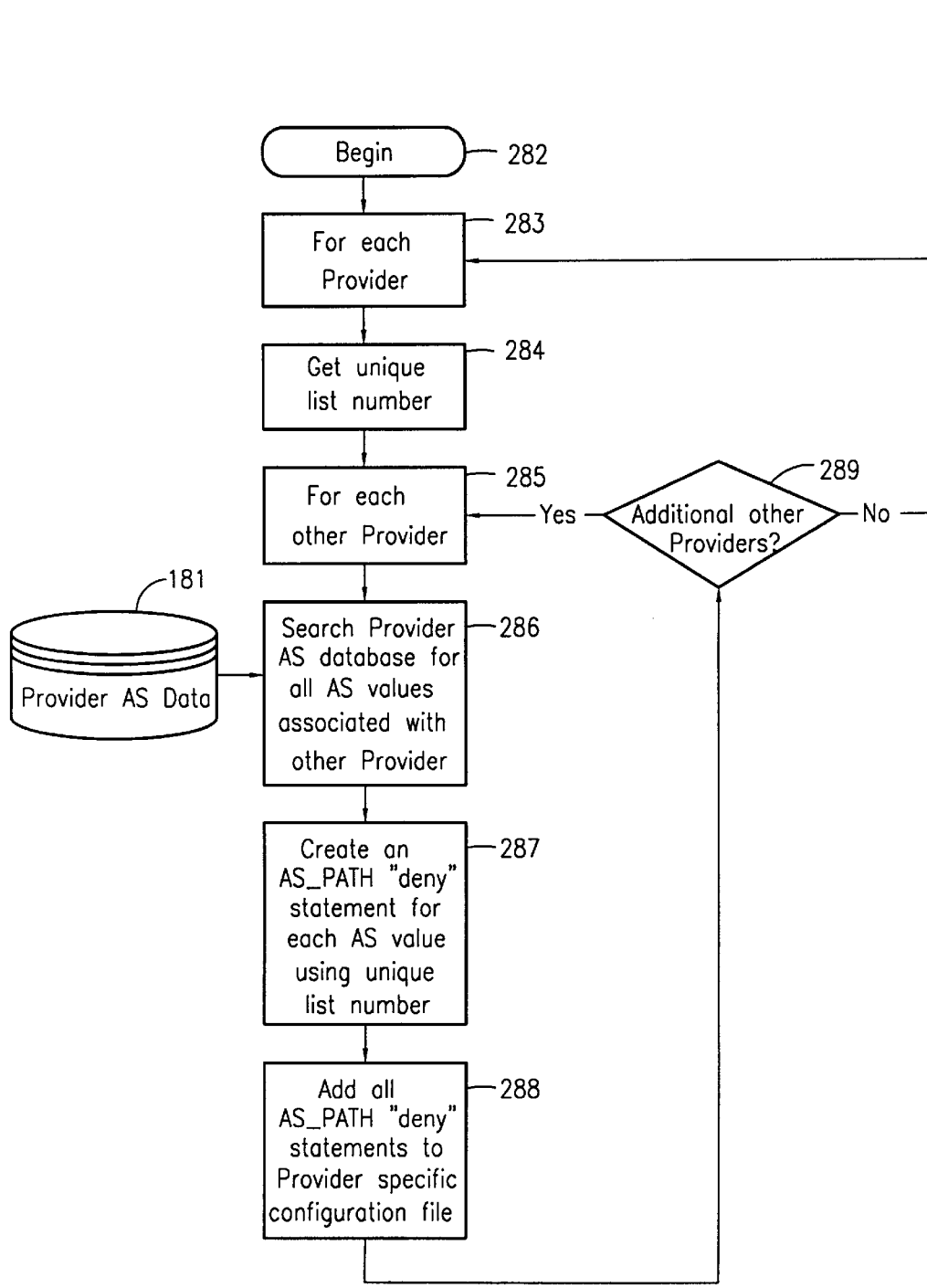
FIG. 17 is a flow chart indicating steps involved in applying databases created by the P-NAP ASsimilator process and path verification process to P-NAP LOCAL_PREF router configurations for each provider.
Figure 17B:
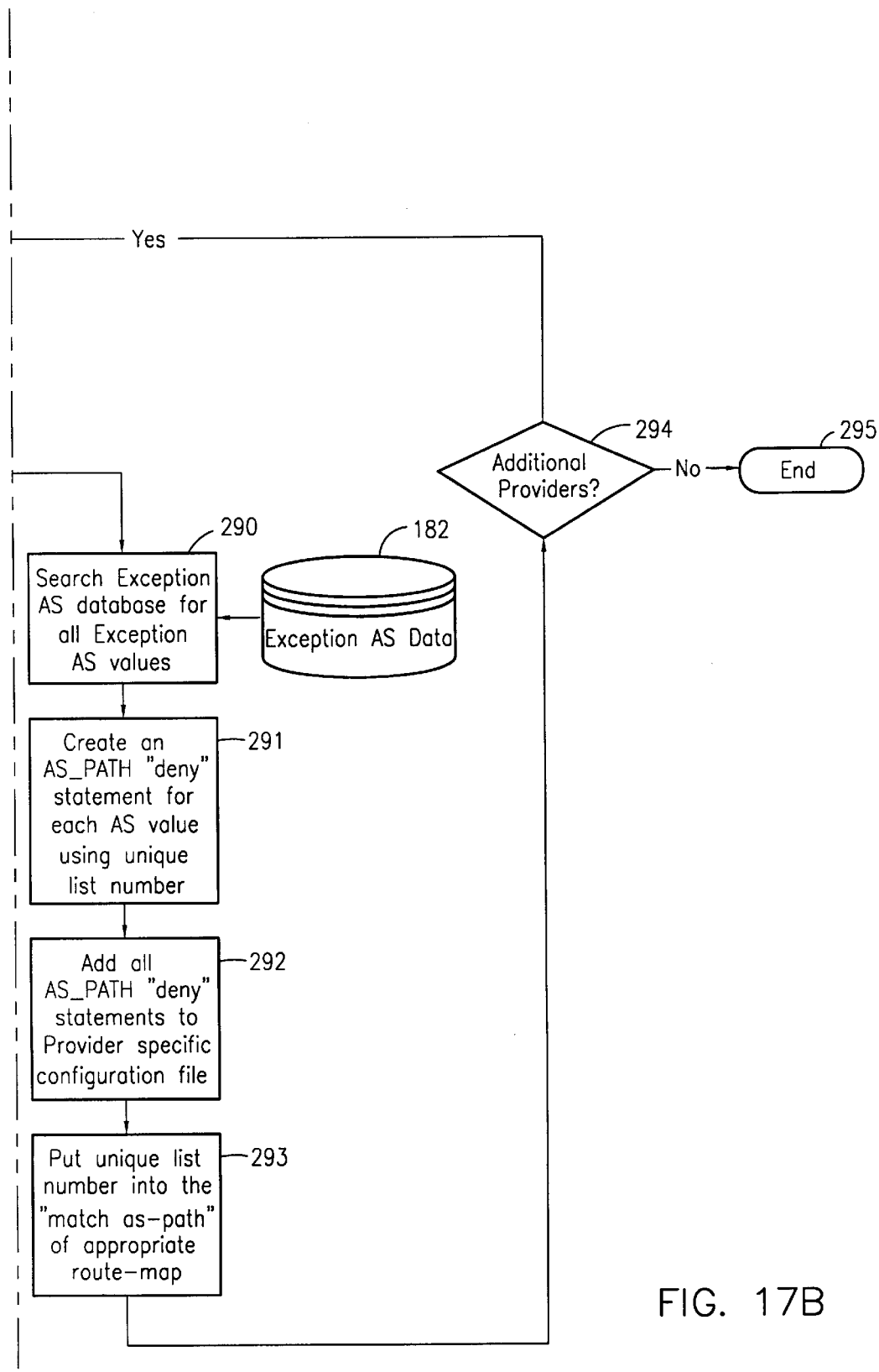

FIG. 17 is a flow chart indicating the steps involved in creating and referencing the "deny" statements in each Provider specific base configuration. This flow chart elaborates on the third step 190 of FIG. 11 labeled "Add P-NAP LOCAL_PREF configurations". The process of FIG. 17 starts with a terminal 282 labeled "Begin" . The first step is indicated by a box 283 labeled "For each Provider". Thus, this marks the beginning of an outer loop which will add to configuration files for each P-NAP Provider. The sequence then flows to a box 284 labeled "Get unique list number". Each list of AS numbers within a router configuration must have a unique number of the appropriate type. Within a Cisco router, AS lists must have a unique number between 1 and 99. As this step requires, because it is at the top of the loop for each Provider, each Provider AS list must have a unique list number. The sequence then flows to a box 285 labeled "For each other Provider". This is the beginning of an inner loop which traverses all Providers except the current Provider. Thus if the outer loop is currently on UUNet, the inner loop would traverse Sprint, MCI, ANS, Netcom, AGIS, and PSI. The order of the outer loop traversal or inner loop traversal is not relevant, although since the providers are all already ordered from the routing policy, it make as much sense as any to traverse them in the same order. The sequence then flows to a box 286 labeled "Search Provider AS database for all AS values associated with other Provider". Thus, for the current Provider of the inner loop, lookup all AS numbers associated with that Provider in the Provider AS Data database 181. The sequence then flows to a box 287 labeled "Create an AS_PATH "deny" statement for each AS value using unique list number". For each of the AS numbers returned by the lookup in box 286, create an AS_PATH deny statement using the unique list number of box 284. Using the P-NAP of the present invention, if the inner loop Provider is currently Netcom, the returned AS numbers would be 2551 and 6993. Also assume that the current unique list number is 20. The resulting Cisco specific AS_PATH deny statements with Netcom as the current inner loop Provider would be:

ip as-path access-list 20 deny__2551
ip as-path access-list 20 deny__6993

The sequence then flows to a box 288 labeled "Add all AS_PATH "deny" statements to Provider specific configuration file". This step takes all of the previously discussed "deny" statements and adds them to the Provider specific configuration. The sequence then flows to a decision block 289 labeled "Additional other Providers?". If there are additional Providers to process which are not the outer loop Provider, then the answer to this decision block would be yes, and the sequence would flow back to box 285. If the answer to decision block 289 is no, then the sequence flows to a box 290 labeled "Search Exception As database for all Exception AS values". Prior to box 290, the inner loop beginning at box 285 and ending at decision block 289 implemented the previously discussed concept of taking the union of the Provider AS Data database 181 and subtracting the AS numbers of the current Provider. Once at box 290, the Exception AS Data database 182 is queried for all of its data. The sequence then flows to a box 291 labeled "Create an AS_PATH "deny" statement for each AS value using unique list number". This creates "deny" statements in the same manner as box 287, using the same unique list number (because we are still within the same outer loop Provider). The sequence then flows to a box 292 labeled "Add all AS_PATH "deny" statements to Provider specific configuration file". This step is the same as box 288. The sequence then flows to a box 293 labeled "Put unique list number into the "match as-path" of appropriate route-map". As discussed previously, each Provider configuration has a Cisco configuration called a "route-map" which is labeled <Provider>-LOCAL-PREF. Within this route map is a "match as-path <fill in the blank>" command. The step of box 293 places the unique access list number of box 284 into this "match as-path . . . " command. As an example, the MCI LOCAL_PREF route-map would look like the following:

```
route-map MCI-LOCAL-PREF permit 10
    match as-path 20
    set local-preference 98
route-map MCI-LOCAL-PREF permit 20
    match as-path 1
    set local-preference 25
``` where list number "20" is the list of "deny" statements for MCI created through the process of this FIG. 17. It will be understood, and has been described before, that the first route-map piece assigns a local-preference value to all routes assumed to be directly attached to the provider and the second route-map piece assigns the "default" local-preference to all remaining routes not matching the first route-map. The sequence then flows to a decision block 294 labeled "Additional Providers?". If there are additional Providers to process in the outer loop, then the answer to decision block 294 is yes, then the sequence flows back to box 283. If there answer to the decision block is no, the sequence ends at terminal 295.

Figure 18:
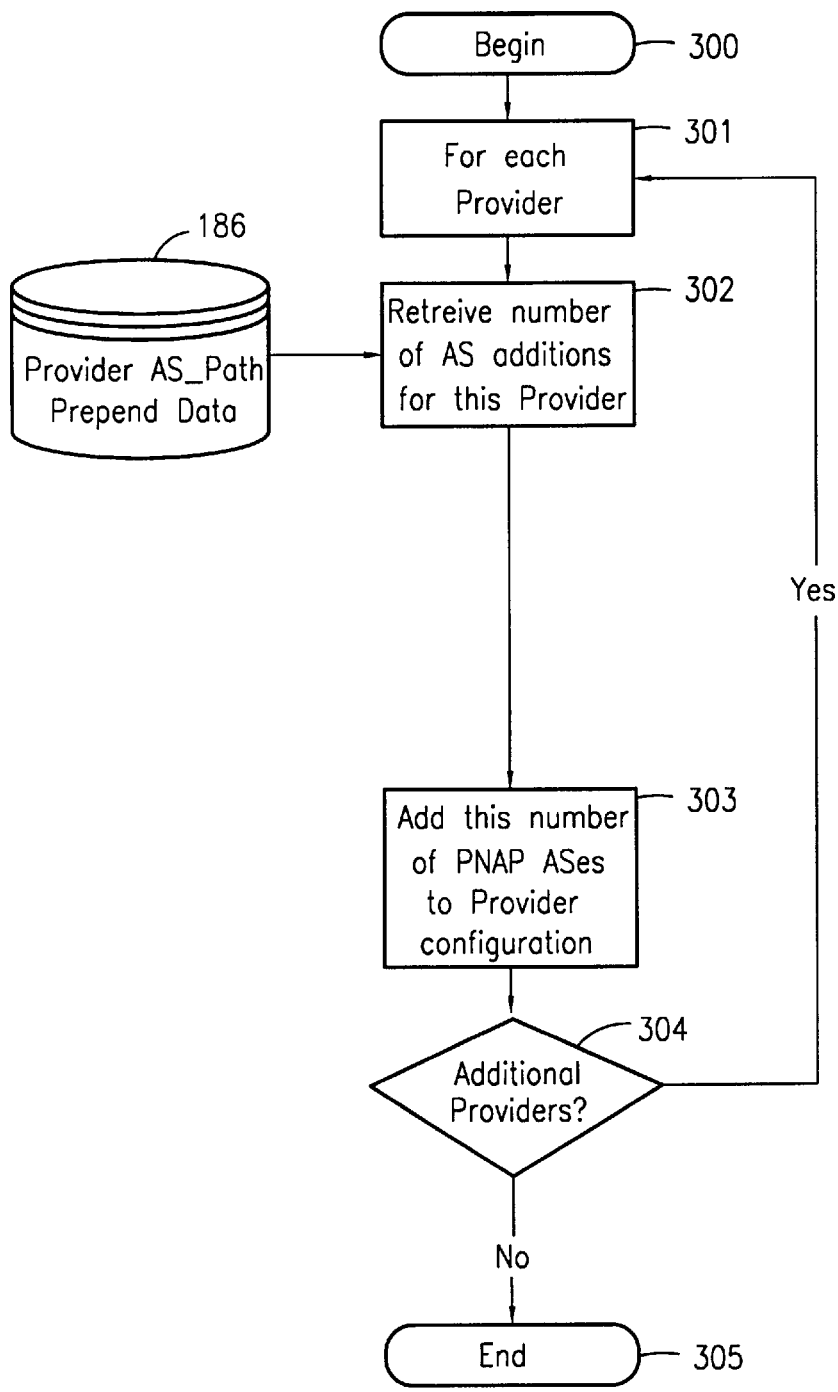
FIG. 18 is a flow chart indicating steps involved in applying a database created by the AS_PATH length process to the router configurations for each provider.

FIG. 18 is a flow chart indicating the steps involved in adding the appropriate number of AS additions to routes advertised to each Provider. FIG. 18 is the detail of the AS_PATH length configuration of step number four 191 of FIG. 11. This process starts at a terminal 300 labeled "Begin". The first step is indicated by a box 301 labeled "For each Provider". This is the beginning of a loop which will process once for each P-NAP Provider. There is no requirement that the Providers be processed in a specific order. The sequence then moves to a box 302 labeled "Retrieve number of AS additions for this Provider". Thus, a search of the Provider AS_PATH Prepend Data database 186 is made for the current Provider to find the number of AS additions which need to be added for this Provider. As was described previously, the Provider AS_PATH Prepend Data database 186 is populated by the algorithm described in connection with FIG. 15. The sequence then moves to a box 303 labeled "Add this number of P-NAP ASes to Provider configuration". Within each Provider configuration, as was discussed previously, there exists a Cisco route-map named "<Provider>-ASPATH-PREPEND". Within this route-map there is a "set as-path prepend <fill in the blank>" command. At the <fill in the blank> point should be a number of the current P-NAP AS numbers (6993 in the P-NAP of the present invention) equal to the number retrieved from the Provider AS_PATH Prepend Data database 186. Thus, using the P-NAP of the present invention, The ANS-ASPATH-PREPEND route-map would look like the following:

```
route-map ANS-ASPATH-PREPEND permit 10
    match as-path 10
    set as-path prepend 6993 6993 6993 6993
```

Searching the Provider AS_PATH Prepend Data database 186 for Netcom, returns a value of "4". That number of the current P-NAP AS (6993) are added to the "set as-path prepend" statement for the ANS-ASPATH-PREPEND route-map. The sequence then flows to a decision block 304 labeled "Additional Providers?". If there are additional Providers to process and thus the answer to decision block 304 is yes, the sequence then flows back to box 301. If the answer to decision block 304 is no, the sequence ends at terminal 305.

Thus there has been described the best mode for carrying out the invention of a Private Network Access Point router for interconnecting among Internet route providers. As may be seen from the foregoing description, this Private Network Access Point router provides a method for exchanging information packets among a plurality of network route providers without random route switching, without asymmetric routing over forward and reverse paths, and without overloading, causing loss of information packets.

The present invention has been particularly shown and described with respect to certain preferred embodiments and features thereof. However, it should be readily apparent to those of ordinary skill in the art that various changes and modifications in form and detail may be made without departing from the spirit and scope of the inventions as set forth in the appended claims. The invention illustratively disclosed herein may be practiced without any element which is not specifically disclosed herein.

What is claimed is:

1. A method for symmetrically routing packets among a P-NAP and at least two providers, said providers having customers, comprising the steps of:
   a) creating router configuration files which use local preferences, causing the P-NAP to route to the P-NAP provider's customers over that provider's network, causing the P-NAP to route over a preselected provider's network to customers not connected to a P-NAP provider or customer of provider's connected to more than three P-NAP providers and using P-NAP path length to cause customers of providers not connected to the P-NAP to route over a preselected P-NAP provider;
   b) setting the P-NAP provider local preferences for causing the P-NAP provider to select direct routing to the P-NAP;
   c) applying configuration files to a router;
   d) causing the router to obtain routes from the P-NAP provider; and
   e) causing the router to apply said router configuration files to said routes.

2. A method for symmetrically routing TCP/IP packets between a P-NAP and any destination on the Internet such that if the destination is part of any P-NAP provider, the forward and reverse path of the packets will be across said provider and in all other cases the forward and reverse path will be across a pre-determined provider, said providers having customers, comprising the steps of:
   a) creating router configuration files which use local preferences causing the P-NAP to route to the P-NAP provider's customers over that provider's network, causing the P-NAP to route over a preselected provider's network to customers not connected to a P-NAP provider or customer of provider's connected to more than three P-NAP providers and using P-NAP path length to cause customers of providers not connected to the P-NAP to route over a preselected P-NAP provider;

b) setting the P-NAP provider local preferences for causing the P-NAP provider to select direct routing to the P-NAP;

c) applying configuration files to a router;

d) causing the router to obtain routes from the P-NAP provider; and e) causing the router to apply said router configuration files to said routes.

3. A method for ensuring that the routing of TCP/IP packets between a P-NAP and any destination on the Internet happens symmetrically across the destination's provider when the P-NAP is connected to said provider and in all other cases across a pre-determined provider, said providers having customers, comprising the steps of:

a) creating router configuration files which use local preferences, causing the P-NAP to route to the P-NAP provider's customers over that provider's network, causing the P-NAP to route over a preselected provider's network to customers not connected to a P-NAP provider or customer of provider's connected to more than three P-NAP providers using P-NAP path length to cause customers of providers not connected to the P-NAP to route over a preselected P-NAP provider;

b) setting the P-NAP provider local preferences for causing the P-NAP provider to select direct routing to the P-NAP;

c) applying configuration files to a router;

d) causing the router to obtain routes from the P-NAP provider; and e) causing the router to apply said router configuration files to said routes.

4. A method for ensuring that the routing of TCP/IP packets between a P-NAP and any destination on the Internet happens symmetrically across the destination's Provider when the P-NAP is connected to Provider and in all other cases across a pre-determined Provider, said providers having customers, comprising the steps of:

a) selecting a LOCAL_PREF value for provider default routing such that for those destinations not connected to a P-NAP provider, the most preferred provider is used, if that provider is unavailable, the next most preferred provider is used and so on, until all providers have been exhausted;

b) creating router configuration files which use local preferences, causing the P-NAP to route to the P-NAP provider's customers over that provider's network, causing the P-NAP to route over a preselected provider's network to customers not connected to a P-NAP provider or customer of provider's connected to more than three P-NAP providers, and using P-NAP path length to cause customers of providers not connected to the P-NAP to route over a preselected P-NAP provider;

c) setting the P-NAP provider local preferences for causing the P-NAP provider to select direct routing to the P-NAP;

d) applying configuration files to a router;

e) causing the router to obtain routes from the P-NAP provider; and f) causing the router to apply said router configuration files to said routes.

* * * * *

UNITED STATES PATENT AND TRADEMARK OFFICE
CERTIFICATE OF CORRECTION

PATENT NO. : 6,009,081
DATED : December 26, 1999
INVENTOR(S) : Christopher D. WHEELER and Ophir RONAN It is certified that error appears in the above-identified patent and that said Letters Patent is hereby corrected as shown below:

In column 9, line 20, please delete[100] and replace with --10--.

Signed and Sealed this

Twenty-fifth Day of July, 2000

Attest:

Q. TODD DICKINSON

Attesting Officer

Director of Patents and Trademarks